(12) United States Patent
Tourapis et al.

(10) Patent No.: US 8,379,722 B2
(45) Date of Patent: Feb. 19, 2013

(54) TIMESTAMP-INDEPENDENT MOTION VECTOR PREDICTION FOR PREDICTIVE (P) AND BIDIRECTIONALLY PREDICTIVE (B) PICTURES

(75) Inventors: Alexandros Tourapis, West Windsor, NJ (US); Shipeng Li, Redmond, WA (US); Feng Wu, Beijing (CN); Gary J. Sullivan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1445 days.

(21) Appl. No.: 11/465,938

(22) Filed: Aug. 21, 2006

(65) Prior Publication Data
US 2006/0280253 A1 Dec. 14, 2006

Related U.S. Application Data

(63) Continuation of application No. 10/620,320, filed on Jul. 15, 2003, now Pat. No. 7,154,952, which is a continuation-in-part of application No. 10/444,511, filed on May 23, 2003, now abandoned.

(60) Provisional application No. 60/397,187, filed on Jul. 19, 2002.

(51) Int. Cl.
*H04N 7/12* (2006.01)
*H04N 11/02* (2006.01)
*H04N 11/04* (2006.01)

(52) U.S. Cl. ......... 375/240.16; 375/240.15; 375/240.24

(58) Field of Classification Search ............. 375/240.15, 375/240.16, 240.24
See application file for complete search history.

(56) References Cited

U.S. PATENT DOCUMENTS

| | | |
|---|---|---|
| 4,454,546 A | 6/1984 | Mori |
| 4,661,849 A | 4/1987 | Hinman |
| 4,661,853 A | 4/1987 | Roeder et al. |
| 4,695,882 A | 9/1987 | Wada et al. |
| 4,796,087 A | 1/1989 | Guichard et al. |
| 4,849,812 A | 7/1989 | Borgers et al. |
| 4,862,267 A | 8/1989 | Gillard et al. |
| 4,864,393 A | 9/1989 | Harradine et al. |
| 5,021,879 A | 6/1991 | Vogel |
| 5,068,724 A | 11/1991 | Krause et al. |
| 5,089,887 A | 2/1992 | Robert et al. |
| 5,089,889 A | 2/1992 | Sugiyama |
| 5,091,782 A | 2/1992 | Krause et al. |
| 5,103,306 A | 4/1992 | Weiman et al. |
| 5,111,292 A | 5/1992 | Kuriacose et al. |
| 5,117,287 A | 5/1992 | Koike et al. |
| 5,132,792 A | 7/1992 | Yonemitsu et al. |
| 5,157,490 A | 10/1992 | Kawai et al. |
| 5,175,618 A | 12/1992 | Ueda |

(Continued)

FOREIGN PATENT DOCUMENTS

| | | |
|---|---|---|
| EP | 0 279 053 | 8/1988 |
| EP | 0 397 402 | 11/1990 |

(Continued)

OTHER PUBLICATIONS

U.S. Appl. No. 60/341,674, filed Dec. 17, 2001, Lee et al.

(Continued)

*Primary Examiner* — Mehrdad Dastouri
*Assistant Examiner* — Jeremaiah Hallenbeck-Huber
(74) *Attorney, Agent, or Firm* — Klarquist Sparkman, LLP

(57) ABSTRACT

Methods and apparatuses are provided for achieving improved video coding efficiency through the use of Motion Vector Predictors (MVPs) for the encoding or decoding of motion parameters within the calculation of the motion information in B pictures and/or P pictures. Certain exemplary methods and apparatuses selectively apply temporal and/or spatial prediction. Rate Distortion Optimization (RDO) techniques are also applied in certain methods and apparatuses to further help improve coding efficiency.

19 Claims, 16 Drawing Sheets

U.S. PATENT DOCUMENTS

| | | | |
|---|---|---|---|
| 5,185,819 A | 2/1993 | Ng et al. |
| 5,193,004 A | 3/1993 | Wang et al. |
| 5,223,949 A | 6/1993 | Honjo |
| 5,227,878 A | 7/1993 | Puri et al. |
| 5,235,618 A | 8/1993 | Sakai et al. |
| 5,260,782 A | 11/1993 | Hui |
| 5,287,420 A | 2/1994 | Barrett |
| 5,298,991 A | 3/1994 | Yagasaki et al. |
| 5,317,397 A | 5/1994 | Odaka et al. |
| 5,343,248 A | 8/1994 | Fujinami |
| 5,347,308 A | 9/1994 | Wai |
| 5,400,075 A | 3/1995 | Savatier |
| 5,412,430 A | 5/1995 | Nagata |
| 5,412,435 A | 5/1995 | Nakajima |
| RE34,965 E | 6/1995 | Sugiyama |
| 5,424,779 A | 6/1995 | Odaka |
| 5,428,396 A | 6/1995 | Yagasaki |
| 5,442,400 A | 8/1995 | Sun |
| 5,448,297 A | 9/1995 | Alattar et al. |
| 5,453,799 A | 9/1995 | Yang et al. |
| 5,461,421 A | 10/1995 | Moon |
| RE35,093 E | 11/1995 | Wang et al. |
| 5,467,086 A | 11/1995 | Jeong |
| 5,467,134 A | 11/1995 | Laney et al. |
| 5,467,136 A | 11/1995 | Odaka |
| 5,477,272 A | 12/1995 | Zhang et al. |
| RE35,158 E | 2/1996 | Sugiyama |
| 5,510,840 A | 4/1996 | Yonemitsu et al. |
| 5,539,466 A | 7/1996 | Igarashi et al. |
| 5,565,922 A | 10/1996 | Krause |
| 5,594,504 A | 1/1997 | Ebrahimi |
| 5,598,215 A | 1/1997 | Watanabe |
| 5,598,216 A | 1/1997 | Lee |
| 5,617,144 A | 4/1997 | Lee |
| 5,619,281 A | 4/1997 | Jung |
| 5,621,481 A | 4/1997 | Yasuda et al. |
| 5,623,311 A | 4/1997 | Phillips et al. |
| 5,648,819 A | 7/1997 | Tranchard |
| 5,666,461 A | 9/1997 | Igarashi et al. |
| 5,677,735 A | 10/1997 | Ueno et al. |
| 5,687,097 A | 11/1997 | Mizusawa et al. |
| 5,691,771 A | 11/1997 | Oishi et al. |
| 5,699,476 A | 12/1997 | Van Der Meer |
| 5,701,164 A | 12/1997 | Kato |
| 5,717,441 A | 2/1998 | Serizawa et al. |
| 5,731,850 A | 3/1998 | Maturi et al. |
| 5,734,755 A | 3/1998 | Ramchandran et al. |
| 5,748,784 A | 5/1998 | Sugiyama |
| 5,767,898 A | 6/1998 | Urano et al. |
| 5,786,860 A | 7/1998 | Kim et al. |
| 5,787,203 A | 7/1998 | Lee et al. |
| 5,796,438 A | 8/1998 | Hosono |
| 5,798,788 A | 8/1998 | Meehan et al. |
| RE35,910 E | 9/1998 | Nagata et al. |
| 5,822,541 A | 10/1998 | Nonomura et al. |
| 5,835,144 A | 11/1998 | Matsumura et al. |
| 5,844,613 A | 12/1998 | Chaddha |
| 5,847,776 A | 12/1998 | Khmelnitsky |
| 5,874,995 A | 2/1999 | Naimpally et al. |
| 5,901,248 A | 5/1999 | Fandrianto et al. |
| 5,923,375 A | 7/1999 | Pau |
| 5,926,573 A | 7/1999 | Kim et al. |
| 5,929,940 A | 7/1999 | Jeannin |
| 5,946,042 A | 8/1999 | Kato |
| 5,949,489 A | 9/1999 | Nishikawa et al. |
| 5,959,673 A | 9/1999 | Lee et al. |
| 5,963,258 A | 10/1999 | Nishikawa et al. |
| 5,963,673 A | 10/1999 | Kodama et al. |
| 5,970,173 A | 10/1999 | Lee et al. |
| 5,970,175 A | 10/1999 | Nishikawa et al. |
| 5,973,743 A | 10/1999 | Han |
| 5,973,755 A | 10/1999 | Gabriel |
| 5,982,438 A | 11/1999 | Lin et al. |
| 5,990,960 A | 11/1999 | Murakami et al. |
| 5,991,447 A | 11/1999 | Eifrig et al. |
| 6,002,439 A | 12/1999 | Murakami et al. |
| 6,005,980 A | 12/1999 | Eifrig et al. |
| RE36,507 E | 1/2000 | Iu |
| 6,011,596 A | 1/2000 | Burl |
| 6,026,195 A | 2/2000 | Eifrig et al. |
| 6,040,863 A | 3/2000 | Kato |
| 6,055,012 A | 4/2000 | Haskell et al. |
| 6,067,322 A | 5/2000 | Wang |
| 6,081,209 A | 6/2000 | Schuyler et al. |
| 6,094,225 A | 7/2000 | Han |
| RE36,822 E | 8/2000 | Sugiyama |
| 6,097,759 A | 8/2000 | Murakami et al. |
| 6,130,963 A | 10/2000 | Uz et al. |
| 6,154,495 A | 11/2000 | Yamaguchi et al. |
| 6,167,090 A | 12/2000 | Iizuka |
| 6,167,162 A | 12/2000 | Jacquin et al. |
| 6,175,592 B1 | 1/2001 | Kim et al. |
| 6,188,725 B1 | 2/2001 | Sugiyama |
| 6,188,794 B1 | 2/2001 | Nishikawa et al. |
| 6,192,081 B1 | 2/2001 | Chiang et al. |
| 6,201,927 B1 | 3/2001 | Comer |
| 6,205,176 B1 | 3/2001 | Sugiyama |
| 6,205,177 B1 | 3/2001 | Girod et al. |
| RE37,222 E | 6/2001 | Yonemitsu et al. |
| 6,243,418 B1 | 6/2001 | Kim |
| 6,263,024 B1 | 7/2001 | Matsumoto |
| 6,263,065 B1 | 7/2001 | Durinovic-Johri et al. |
| 6,269,121 B1 | 7/2001 | Kwak |
| 6,271,885 B2 | 8/2001 | Sugiyama |
| 6,282,243 B1 | 8/2001 | Kazui et al. |
| 6,295,376 B1 | 9/2001 | Nakaya |
| 6,307,887 B1 | 10/2001 | Gabriel |
| 6,307,973 B2 | 10/2001 | Nishikawa et al. |
| 6,320,593 B1 | 11/2001 | Sobel et al. |
| 6,324,216 B1 | 11/2001 | Igarashi et al. |
| 6,377,628 B1 | 4/2002 | Schultz et al. |
| 6,381,279 B1 | 4/2002 | Taubman |
| 6,404,813 B1 | 6/2002 | Haskell et al. |
| 6,427,027 B1* | 7/2002 | Suzuki et al. ............ 382/236 |
| 6,459,812 B2 | 10/2002 | Suzuki et al. |
| 6,483,874 B1 | 11/2002 | Panusopone et al. |
| 6,496,601 B1 | 12/2002 | Migdal et al. |
| 6,519,287 B1 | 2/2003 | Hawkins et al. |
| 6,529,632 B1 | 3/2003 | Nakaya et al. |
| 6,539,056 B1 | 3/2003 | Sato et al. |
| 6,563,953 B2 | 5/2003 | Lin et al. |
| 6,614,442 B1 | 9/2003 | Ouyang et al. |
| 6,636,565 B1 | 10/2003 | Kim |
| 6,647,061 B1* | 11/2003 | Panusopone et al. .... 375/240.12 |
| 6,650,781 B2 | 11/2003 | Nakaya |
| 6,654,417 B1 | 11/2003 | Hui |
| 6,654,419 B1 | 11/2003 | Sriram et al. |
| 6,654,420 B1 | 11/2003 | Snook |
| 6,683,987 B1 | 1/2004 | Sugahara |
| 6,704,360 B2 | 3/2004 | Haskell et al. |
| 6,728,317 B1 | 4/2004 | Demos |
| 6,735,345 B2 | 5/2004 | Lin et al. |
| RE38,563 E | 8/2004 | Eifrig et al. |
| 6,785,331 B1 | 8/2004 | Jozawa et al. |
| 6,798,364 B2 | 9/2004 | Chen et al. |
| 6,798,837 B1 | 9/2004 | Uenoyama et al. |
| 6,807,231 B1 | 10/2004 | Wiegand et al. |
| 6,816,552 B2 | 11/2004 | Demos |
| 6,873,657 B2 | 3/2005 | Yang et al. |
| 6,876,703 B2 | 4/2005 | Ismaeil et al. |
| 6,900,846 B2 | 5/2005 | Lee et al. |
| 6,920,175 B2 | 7/2005 | Karczewicz et al. |
| 6,973,257 B1 | 12/2005 | Park et al. |
| 6,975,680 B2 | 12/2005 | Demos |
| 6,980,596 B2 | 12/2005 | Wang et al. |
| 6,999,513 B2 | 2/2006 | Sohn et al. |
| 7,003,035 B2 | 2/2006 | Tourapis et al. |
| 7,054,494 B2 | 5/2006 | Lin et al. |
| 7,092,576 B2 | 8/2006 | Srinivasan et al. |
| 7,154,952 B2* | 12/2006 | Tourapis et al. ......... 375/240.16 |
| 7,233,621 B2 | 6/2007 | Jeon |
| 7,280,700 B2 | 10/2007 | Tourapis et al. |
| 7,317,839 B2 | 1/2008 | Holcomb |
| 7,346,111 B2 | 3/2008 | Winger et al. |
| 7,362,807 B2 | 4/2008 | Kondo et al. |
| 7,388,916 B2 | 6/2008 | Park et al. |
| 7,567,617 B2 | 7/2009 | Holcomb |

| | | | |
|---|---|---|---|
| 7,646,810 B2 | 1/2010 | Tourapis et al. | |
| 7,733,960 B2 | 6/2010 | Kondo et al. | |
| 2001/0019586 A1 | 9/2001 | Kang et al. | |
| 2001/0040926 A1 | 11/2001 | Hannuksela et al. | |
| 2002/0105596 A1 | 8/2002 | Selby | |
| 2002/0114388 A1 | 8/2002 | Ueda | |
| 2002/0122488 A1 | 9/2002 | Takahashi et al. | |
| 2002/0154693 A1 | 10/2002 | Demos | |
| 2002/0186890 A1 | 12/2002 | Lee et al. | |
| 2003/0053537 A1 | 3/2003 | Kim et al. | |
| 2003/0099292 A1 | 5/2003 | Wang et al. | |
| 2003/0099294 A1 | 5/2003 | Wang et al. | |
| 2003/0112864 A1 | 6/2003 | Karczewicz et al. | |
| 2003/0113026 A1 | 6/2003 | Srinivasan et al. | |
| 2003/0142748 A1 | 7/2003 | Tourapis | |
| 2003/0142751 A1 | 7/2003 | Hannuksela | |
| 2003/0156646 A1 | 8/2003 | Hsu et al. | |
| 2003/0202590 A1 | 10/2003 | Gu et al. | |
| 2003/0206589 A1 | 11/2003 | Jeon | |
| 2004/0001546 A1 | 1/2004 | Tourapis et al. | |
| 2004/0008899 A1 | 1/2004 | Tourapis et al. | |
| 2004/0047418 A1 | 3/2004 | Tourapis et al. | |
| 2004/0136457 A1 | 7/2004 | Funnell et al. | |
| 2004/0139462 A1 | 7/2004 | Hannuksela et al. | |
| 2004/0141651 A1 | 7/2004 | Hara et al. | |
| 2004/0146109 A1 | 7/2004 | Kondo et al. | |
| 2004/0228413 A1 | 11/2004 | Hannuksela | |
| 2004/0234143 A1 | 11/2004 | Hagai et al. | |
| 2005/0013497 A1 | 1/2005 | Hsu et al. | |
| 2005/0013498 A1 | 1/2005 | Srinivasan | |
| 2005/0036759 A1 | 2/2005 | Lin et al. | |
| 2005/0053137 A1 | 3/2005 | Holcomb | |
| 2005/0053147 A1 | 3/2005 | Mukerjee et al. | |
| 2005/0053149 A1 | 3/2005 | Mukerjee et al. | |
| 2005/0100093 A1 | 5/2005 | Holcomb | |
| 2005/0129120 A1 | 6/2005 | Jeon | |
| 2005/0135484 A1 | 6/2005 | Lee | |
| 2005/0147167 A1 | 7/2005 | Dumitras et al. | |
| 2005/0185713 A1 | 8/2005 | Winger et al. | |
| 2005/0207490 A1 | 9/2005 | Wang | |
| 2005/0249291 A1 | 11/2005 | Gordon et al. | |
| 2005/0254584 A1 | 11/2005 | Kim et al. | |
| 2006/0013307 A1 | 1/2006 | Olivier et al. | |
| 2006/0072662 A1 | 4/2006 | Tourapis et al. | |
| 2007/0064801 A1 | 3/2007 | Wang et al. | |
| 2007/0177674 A1 | 8/2007 | Yang | |
| 2008/0043845 A1 | 2/2008 | Nakaishi | |
| 2008/0069462 A1 | 3/2008 | Abe | |
| 2008/0075171 A1 | 3/2008 | Suzuki | |
| 2008/0117985 A1 | 5/2008 | Chen et al. | |
| 2009/0238269 A1 | 9/2009 | Pandit et al. | |

FOREIGN PATENT DOCUMENTS

| | | | |
|---|---|---|---|
| EP | 0 526 163 | | 2/1993 |
| EP | 0 535 746 | | 4/1993 |
| EP | 0 540 350 | | 5/1993 |
| EP | 0 588 653 | | 3/1994 |
| EP | 0 614 318 | | 9/1994 |
| EP | 0 625 853 | | 11/1994 |
| EP | 0 771 114 | | 5/1997 |
| EP | 0 782 343 | | 7/1997 |
| EP | 0 786 907 | | 7/1997 |
| EP | 0 830 029 | | 3/1998 |
| EP | 0 863 673 | A1 | 9/1998 |
| EP | 0 863 674 | | 9/1998 |
| EP | 0 863 675 | | 9/1998 |
| EP | 0 874 526 | | 10/1998 |
| EP | 0 884 912 | | 12/1998 |
| EP | 0 901 289 | | 3/1999 |
| EP | 0 944 245 | | 9/1999 |
| EP | 1 006 732 | | 7/2000 |
| EP | 1 427 216 | | 6/2004 |
| GB | 2328337 | | 2/1999 |
| GB | 2332115 | | 6/1999 |
| GB | 2343579 | | 5/2000 |
| JP | 61205086 | | 9/1986 |
| JP | 62 213 494 | | 9/1987 |
| JP | 3-001688 | | 1/1991 |
| JP | 3 129 986 | | 3/1991 |
| JP | 05-137131 | | 6/1993 |
| JP | 6 078 298 | | 3/1994 |
| JP | 6-078295 | | 3/1994 |
| JP | 06-276481 | | 9/1994 |
| JP | 06-276511 | | 9/1994 |
| JP | 6-292188 | | 10/1994 |
| JP | 7-274171 | | 10/1995 |
| JP | 07-274181 | | 10/1995 |
| JP | 08-140099 | | 5/1996 |
| JP | 09-121355 | | 5/1997 |
| JP | 09-322163 | | 12/1997 |
| JP | 10056644 | | 2/1998 |
| JP | 11 136683 | | 5/1999 |
| JP | 2000-307672 | | 11/2000 |
| JP | 2000-308064 | | 11/2000 |
| JP | 2001-025014 | | 1/2001 |
| JP | 2002-118598 | | 4/2002 |
| JP | 2002-121053 | | 4/2002 |
| JP | 2002-156266 | | 5/2002 |
| JP | 2002-177889 | | 6/2002 |
| JP | 2002-193027 | | 7/2002 |
| JP | 2002-204713 | | 7/2002 |
| JP | 2004/208259 | | 7/2004 |
| RU | 2182727 | C2 | 5/2002 |
| WO | WO 00/33581 | | 8/2000 |
| WO | 01/95633 | | 12/2001 |
| WO | 02/37859 | | 5/2002 |
| WO | WO 02/43399 | | 5/2002 |
| WO | 02/062074 | | 8/2002 |
| WO | WO 03/026296 | | 3/2003 |
| WO | WO 03/047272 | | 6/2003 |
| WO | WO 03/090473 | | 10/2003 |
| WO | WO 03/090475 | | 10/2003 |
| WO | WO 2005/004491 | | 1/2005 |
| WO | WO 2008/023967 | | 2/2008 |

OTHER PUBLICATIONS

U.S. Appl. No. 60/488,710, filed Jul. 18, 2003, Srinivasan et al.

Anonymous, "DivX Multi Standard Video Encoder," 2 pp.

Chalidabhongse et al., "Fast motion vector estimation using multiresolution spatio-temporal correlations," *IEEE Transactions on Circuits and Systems for Video Technology*, pp. 477-488 (Jun. 1997).

Ericsson, "Fixed and Adaptive Predictors for Hybrid Predictive/Transform Coding," *IEEE Transactions on Comm.*, vol. COM-33, No. 12, pp. 1291-1302 (1985).

Flierl et al., "Multihypothesis Motion Estimation for Video Coding," *Proc. Dcc*, 10 pp. (Mar. 2001).

Fogg, "Survey of Software and Hardware VLC Architectures," *SPIE*, vol. 2186, pp. 29-37 (1994).

Girod, "Efficiency Analysis of Multihypothesis Motion-Compensated Prediction for Video Coding," *IEEE Transactions on Image Processing*, vol. 9, No. 2, pp. 173-183 (Feb. 2000).

Girod, "Motion-Compensation: Visual Aspects, Accuracy, and Fundamental Limits," *Motion Analysis and Image Sequence Processing*, Kluwer Academic Publishers, pp. 125-152 (1993).

Horn et al., "Estimation of Motion Vector Fields for Multiscale Motion Compensation," *Proc. Picture Coding Symp.* (PCS 97), pp. 141-144 (Sep. 1997).

Hsu et al., "A Low Bit-Rate Video Codec Based on Two-Dimensional Mesh Motion Compensation with Adaptive Interpolation," *IEEE Transactions on Circuits and Systems for Video Technology*, vol. 11, No. 1, pp. 111-117 (Jan. 2001).

ISO/IEC, "MPEG-4 Video Verification Model Version 18.0," ISO/IEC JTC1/SC29/WG11 N3908, Pisa, pp. 1-10, 299-311 (Jan. 2001).

ISO/IEC, "ISO/IEC 11172-2: Information Technology—Coding of Moving Pictures and Associated Audio for Storage Media at up to About 1.5 Mbit/s," 122 pp. (1993).

ISO/IEC, "Information Technology—Coding of Audio-Visual Objects: Visual, ISO/IEC 14496-2, Committee Draft," 330 pp. (1998).

ISO/IEC, "MPEG-4 Video Verification Model Version 10.0," ISO/IEC JTC1/SC29/WG11, MPEG98/N1992, 305 pp. (1998).

ITU—Ql5-F-24, "MVC Video Codec—Proposal for H.26L," Study Group 16, Video Coding Experts Group (Question 15), 28 pp. (document marked as generated in 1998).

ITU-T, "ITU-T Recommendation H.261: Video Codec for Audiovisual Services at $p \times 64$ kbits," 28 pp. (1993).

ITU-T, "ITU-T Recommendation H.262: Information Technology—Generic Coding of Moving Pictures and Associated Audio Information: Video," 218 pp. (1995).

ITU-T, "ITU-T Recommendation H.263: Video Coding for Low Bit Rate Communication," 167 pp. (1998).

Joint Video Team of ISO/IEC MPEG and ITU-T VCEG, "Text of Committee Draft of Joint Video Specification (ITU-T Rec. H.264, ISO/IEC 14496-10 AVC)," Document JVT-C167, 143 pp. (May 2002).

Joint Video Team of ISO/IEC MPEG and ITU-T VCEG, "Joint Final Committee Draft (JFCD) of Joint Video Specification (ITU-T Recommendation H.264, ISO/IEC 14496-10 AVC," JVT-D157 (Aug. 2002).

Joint Video Team (JVT) of ISO/IEC MPEG and ITU-T VCEG, "Joint Model No. 1, Revision 1 (JM-1r1)," JVT-A003r1, Pattaya, Thailand, 80 pp. (Dec. 2001).

Joint Video Team (JVT) of ISO/IEC MPEG and ITU-T VCEG, "Study of Final Committee Draft of Joint Video Specification," JVT-F100, Awaji Island, 242 pp. (Dec. 2002).

Konrad et al., "On Motion Modeling and Estimation for Very Low Bit Rate Video Coding," Visual Comm. & Image Processing (VCIP '95), 12 pp. (May 1995).

Kossentini et al., "Predictive RD Optimized Motion Estimation for Very Low Bit-rate Video Coding," IEEE J. on Selected Areas in Communications, vol. 15, No. 9 pp. 1752-1763 (Dec. 1997).

Lainema et al., "Skip Mode Motion Compensation," Joint Video Team (JVT) of ISO/IEC MPEG & ITU-T VCEG (ISO/IEC JTC1/SC29/WG11 and ITU-T SG16 Q.6), Document JVT-C027, 8 pp. (May 2002).

Microsoft Corporation, "Microsoft Debuts New Windows Media Players 9 Series, Redefining Digital Media on the PC," 4 pp. (Sep. 4, 2002) [Downloaded from the World Wide Web on May 14, 2004].

Mook, "Next-Gen Windows Media Player Leaks to the Web," BetaNews, 17 pp. (Jul. 19, 2002) [Downloaded from the World Wide Web on Aug. 8, 2003].

Panusopone et al., "Direct Prediction for Predictive (P) Picture in Field Coding mode," Joint Video Team (JVT) of ISO/IEC MPEG & ITU-T VCEG, Document JVT-D046, 8 pp. (Jul. 2002).

Printouts of FTP directories from http://ftp3.itu.ch, 8 pp. (downloaded from the World Wide Web on Sep. 20, 2005).

Reader, "History of MPEG Video Compression—Ver. 4.0," 99 pp. (document marked Dec. 16, 2003).

Schwarz et al., "Tree-structured macroblock partition," ITU-T SG16/Q.6 VCEG-O17, 6 pp. (Dec. 2001).

Schwarz et al., "Core Experiment Results on Improved Macroblock Prediction Modes," Joint Video Team (JVT) of ISO/IEC MPEG & ITU-T VCEG (ISO/IEC JTC1/SC29/WG11 and ITU-T SG16 Q.6), Document JVT-B054, 10 pp. (Jan.-Feb. 2002).

Sullivan et al., "The H.264/AVC Advanced Video Coding Standard: Overview and Introduction to the Fidelity Range Extensions," 21 pp. (Aug. 2004).

"The TML Project WEB-Page and Archive," (including pages of code marked "image.cpp for H.26L decoder, Copyright 1999" and "image.c"), 24 pp.

Tourapis et al., "Direct Prediction for Predictive (P) and Bidirectionally Predictive (B) frames in Video Coding ," Joint Video Team (JVT) of ISO/IEC MPEG & ITU-T VCEG (ISO/IEC JTC1/SC29/WG11 and ITU-T SG16 Q.6), Document JVT-C128, 11 pp. (May 2002).

Tourapis et al., "Motion Vector Prediction in Bidirectionally Predictive (B) frames with regards to Direct Mode," Joint Video Team (JVT) of ISO/IEC MPEG & ITU-T VCEG (ISO/IEC JTCl/SC29/WG11 and ITU-T SG16 Q.6), Document JVT-C127, 7 pp. (May 2002).

Tourapis et al., "Timestamp Independent Motion Vector Prediction for P and B frames with Division Elimination," Joint Video Team (JVT) of ISO/IEC MPEG & ITU-T VCEG (ISO/IEC JTC1/SC29/WG11 and ITU-T SG16 Q.6), Document JVT-D040, 18 pp. (Jul. 2002).

Tourapis et al., "Performance Comparison of Temporal and Spatial Direct mode," Joint Video Team (JVT) of ISO/IEC MPEG & ITU-T VCEG (ISO/IEC JTC1/SC29/WG11 and ITU-T SGI6 Q.6), Document JVT-E026, 7 pp. (Oct. 2002).

Wang et al., "Interlace Coding Tools for H.26L Video Coding," ITU-T SG16/Q.6 VCEG-O37, pp. 1-20 (Dec. 2001).

Wiegand et al., "Motion-compensating Long-term Memory Prediction," Proc. Int'l Conf. on Image Processing, 4 pp. (Oct. 1997).

Wiegand et al., "Long-term Memory Motion Compensated Prediction," IEEE Transactions on Circuits & Systems for Video Technology, vol. 9, No. 1, pp. 70-84 (Feb. 1999).

Wien, "Variable Block-Size Transforms for Hybrid Video Coding," Dissertation, 182 pp. (Feb. 2004).

Wu et al., "Joint estimation of forward and backward motion vectors for interpolative prediction of video," *IEEE Transactions on Image Processing*, vol. 3, No. 5, pp. 684-687 (Sep. 1994).

Yu et al., "Two-Dimensional Motion Vector Coding for Low Bitrate Videophone Applications," *Proc. Int'l Conf. on Image Processing*, Los Alamitos, US, pp. 414-417, IEEE Comp. Soc. Press (1995).

U.S. Appl. No. 60/501,081, filed Sep. 7, 2003, Srinivasan et al.

Grigoriu, "Spatio-temporal compression of the motion field in video coding," 2001 IEEE Fourth Workshop on Multimedia Signal Processing, pp. 129-134 (Oct. 2001).

Huang et al., "Hardware architecture design for variable block size motion estimation in MPEG-4 AVC/JVT/ITU-T H.264," *Proc. of the 2003 Int'l Symposium on Circuits & Sys.* (ISCAS '03), vol. 2, pp. 796-799 (May 2003).

Joint Video Team (JVT) of ISO/IEC MPEG and ITU-T VCEG, Working Draft No. 2, Revision 2 (WD-2), JVT-B118r2, 106 pp. (Jan. 2002).

Wang et al., "Adaptive frame/field coding for JVT Video Coding," ITU-T SG16 Q.6 JVT-B071, 24 pp. (Jan. 2002).

Abe et al., "Clarification and Improvement of Direct Mode," JVT-D033, 9 pp. (document marked Jul. 16, 2002).

Gu et al., "Introducing Direct Mode P-picture (DP) to reduce coding complexity," Joint Video Team (JVT) of ISO/IEC MPEG & ITU-T VCEG, Document No. JVT-C044, 10 pp. (Mar. 2002).

Jeon et al., "B picture coding for sequence with repeating scene changes," JVT-C120, 9 pp. (document marked May 1, 2002).

Kondo et al., "New Prediction Method to Improve B-picture Coding Efficiency," VCEG-O26, 9 pp. (document marked Nov. 26, 2001).

Kondo et al., "Proposal of Minor Changes to Multi-frame Buffering Syntax for Improving Coding Efficiency of B-pictures," JVT-B057, 10 pp. (document marked Jan. 23, 2002).

Tourapis et al., "Temporal Interpolation of Video Sequences Using Zonal Based Algorithms," *IEEE*, pp. 895-898 (Oct. 2001).

Wiegand, "H.26L Test Model Long-Term No. 9 (TML-0) draft 0," ITU-Telecommunications Standardization Sector, Study Group 16, VCEG-N83, 74 pp. (Dec. 2001).

Ji et al., "New Bi-Prediction Techniques for B Pictures Coding," IEEE Int'l Conf. on Multimedia and Expo, pp. 101-104 (Jun. 2004).

Joint Video Team (JVT) of ISO/IEC MPEG and ITU-T VCEG, Working Draft No. 2, Revision 0 (WD-2), JVT-B118r1, 105 pp. (Jan. 2002).

Ko et al., "Fast Intra-Mode Decision Using Inter-Frame Correlation for H.264/AVC," Proc. IEEE ISCE 2008, 4 pages (Apr. 2008).

Pourazad et al., "An H.264-based Video Encoding Scheme for 3D TV," EURASIP European Signal Processing Conference—EUSIPCO, Florence, Italy, 5 pages (Sep. 2006).

Tourapis et al., "Direct Mode Coding for Bipredictive Slices in the H.264 Standard," IEEE Trans. on Circuits and Systems for Video Technology, vol. 15, No. 1, pp. 119-126 (Jan. 2005).

Chujoh et al., "Verification result on the combination of spatial and temporal," JVT-E095, 5 pp. (Oct. 2002).

Jeon, "Clean up for temporal direct mode," JVT-E097, 13 pp. (Oct. 2002).

Jeon, "Direct mode in B pictures," JVT-D056, 10 pp. (Jul. 2002).

Jeon, "Motion vector prediction and prediction signal in B pictures," JVT-D057, 5 pp. (Jul. 2002).

Kadono et al., "Memory reduction for temporal technique of direct mode," JVT-E076, 12 pp. (Oct. 2002).

Suzuki, "Handling of reference pictures and MVs for direct mode," JVT-D050, 11 pp. (Jul. 2002).

Suzuki et al., "Study of direct mode," JVT-E071 rl, 7 pp. (Oct. 2002).

Tourapis et al., "B picture and ABP finalization," JVT-E018, 2 pp. (Oct. 2002).

Winger et al., "HD temporal direct-mode verification & text," JVT-E037, 8 pp. (Oct. 2002).

* cited by examiner

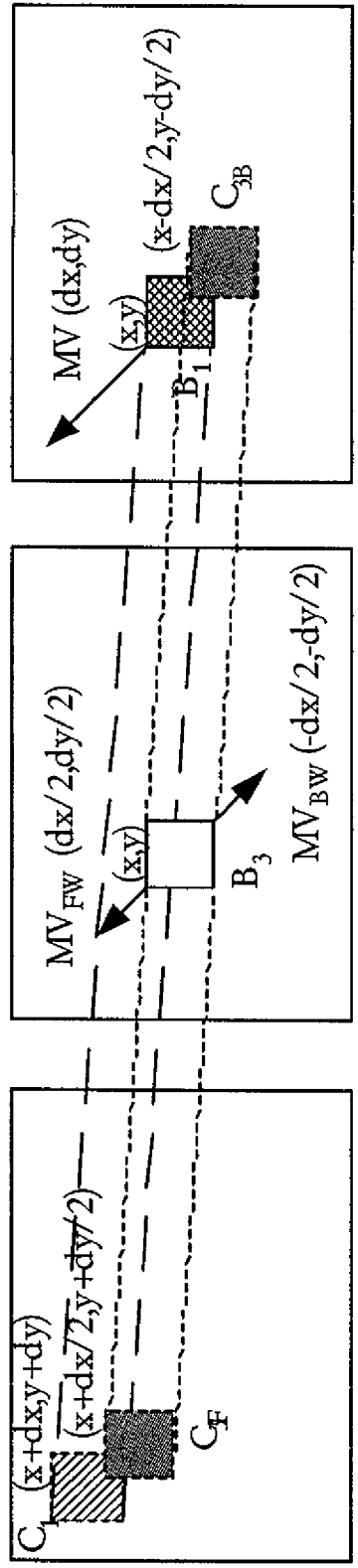
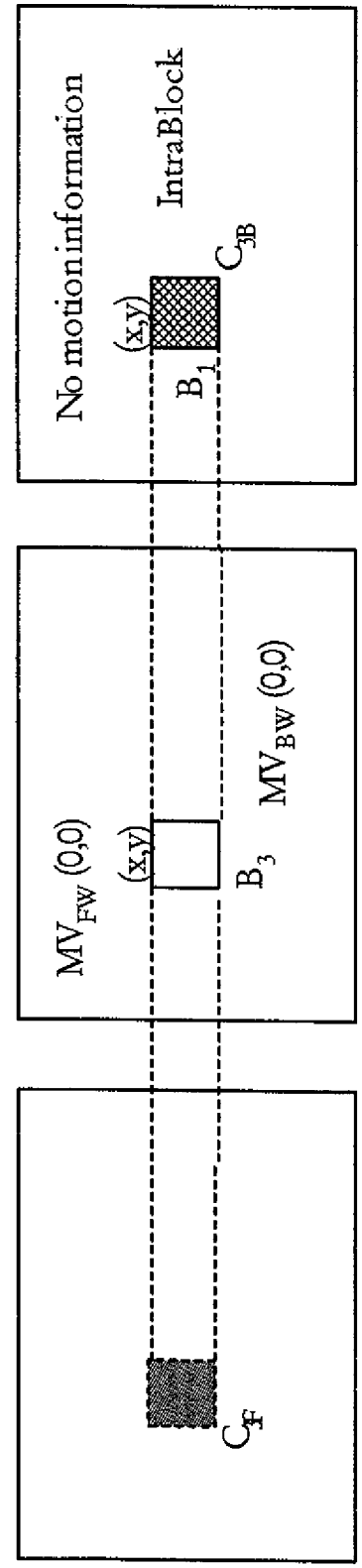
Fig. 3
Fig. 4

| slice_header( ) { | Category | Descriptor |
|---|---|---|
|   parameter_set_id | 4 | e( v ) |
|   first_mb_in_slice | 4 | e( v ) |
|   if ( coding_type( ) = = Inter \|\| coding_type( ) = = Bipred ) { | | |
|     num_ref_pic_active_fwd_minus1 | 4 | e( v ) |
|     if( coding_type( ) = = Bipred ) | | |
|       num_ref_pic_active_bwd_minus1 | 4 | e( v ) |
|     if( coding_type( ) = = Inter ) | | |
|       copy_mv_spatial | 4 | u(1) or e(v) |
|     if( coding_type( ) = = Bipred ) { | | |
|       direct_mv_spatial | 4 | u(1) or e(v) |
|       if( direct_mv_spatial) { | | |
|         direct_mv_scale_fwd | 4 | e( v ) |
|         direct_mv_scale_bwd | 4 | e( v ) |
|         direct_mv_scale_divisor | 4 | e( v ) |
|       } | | |
|       explicit_B_prediction_block_weight_indication | | e( v ) |
|       if ( explicit_B_prediction_block_weight_indication > 1 ) | | |
|         adaptive_B_prediction_coeff_table( ) | | |
|     } | | |
|   } | | |
|   rps_layer( ) | | |
|   slice_qp_minus26  /* relative to 26 */ | 4 | e( v ) |
|   if( coding_type( ) = = SP \|\| coding_type( ) = = SI ) { | | |
|     if (coding_type( ) == SP) | | |
|       sp_for_switch_flag | 4 | u( 1 ) |
|     slice_qp_s_minus26  /* relative to 26 */ | 4 | e( v ) |
|   } | | |
|   if( entropy_coding_mode = = 1 ) | | |
|     num_mbs_in_slice | 4 | e( v ) |
| } | | |

*Fig. 11*

Modes for 8x8 blocks in B pictures/slices

| Code number | 8x8 partition mode | num_subblock_block8x8( ) | block_prediction_mode( ) |
|---|---|---|---|
| 0 | Direct8x8 | 1 | Direct |
| 1 | 8x8 | 1 | Fwd |
| 2 | 8x8 | 1 | Bwd |
| 3 | 8x8 | 1 | Bipred |
| 4 | 8x4 | 2 | Fwd |
| 5 | 4x8 | 2 | Fwd |
| 6 | 8x4 | 2 | Bwd |
| 7 | 4x8 | 2 | Bwd |
| Removed | 8x4 | 2 | Bipred |
| Removed | 4x8 | 2 | Bipred |
| 8 | 4x4 | 4 | Fwd |
| 9 | 4x4 | 4 | Bwd |
| Removed | 4x4 | 4 | Bipred |
| 10 | Intra8x8 | 1 | Intra |

P-Picture Motion Vector Prediction (Non-Skip, non-8x16, non-16x8 MBs)

| Availability of Neighbor MV | | | | MV Prediction $v_E$ derivation for E | Defined |
|---|---|---|---|---|---|
| A | B | C | D | | |
| 0 | 0 | 0 | 0 | 1st rule: $v_A=0$; $v_D=0$; $r_A \neq r_E$; $r_D \neq r_E$;<br>2nd rule: $v_E=v_A=0$; | √ |
| 0 | 0 | 0 | 1 | 3rd rule: $v_C=v_D$; $r_C=r_D$;<br>$v_E$ Not defined since $v_A$ not defined. | x |
| 0 | 0 | 1 | 0 | 1st rule: $v_A=0$; $v_D=0$; $r_A \neq r_E$; $r_D \neq r_E$;<br>$v_E$ Not defined since $v_B$ not defined. | x |
| 0 | 0 | 1 | 1 | $v_E$ Not defined since $v_A$ and $v_B$ not defined. | x |
| 0 | 1 | 0 | 0 | 1st rule: $v_A=0$; $v_D=0$; $r_A \neq r_E$; $r_D \neq r_E$;<br>3rd rule: $v_C=v_D=0$; $r_C=r_D \neq r_E$;<br>4th rule: if B uses same reference picture as E, then $v_E=v_B$; else $v_E$=median($v_A$, $v_B$, $v_C$)=median(0, $v_B$, 0)=0; | √ |
| 0 | 1 | 0 | 1 | 3rd rule: $v_C=v_D$; $r_C=r_D$<br>$v_E$ Not defined since $v_A$ not defined. | √ |
| 0 | 1 | 1 | 0 | 1st rule: $v_A=0$; $v_D=0$; $r_A \neq r_E$; $r_D \neq r_E$;<br>4th rule: if one and only one of B, C uses same reference picture as E, then<br>$v_E=v_B$ or $v_C$ (whichever uses same ref pic); else $v_E$=median($v_A$, $v_B$, $v_C$)=median(0, $v_B$, $v_C$); [even if $v_B$ and $v_C$ use different reference pictures than $v_E$] | √ |
| 0 | 1 | 1 | 1 | $v_E$ Not defined since $v_A$ not defined. | x |
| 1 | 0 | 0 | 0 | 2nd rule: $v_E=v_A$; | √ |
| 1 | 0 | 0 | 1 | 3rd rule: $v_C=v_D$; $r_C=r_D$<br>$v_E$ Not defined since $v_B$ not defined. | x |
| 1 | 0 | 1 | 0 | $v_E$ Not defined since $v_B$ not defined. | x |
| 1 | 0 | 1 | 1 | $v_E$ Not defined since $v_B$ not defined. | x |
| 1 | 1 | 0 | 0 | 3rd rule: $v_C=v_D$; $r_C=r_D$<br>$v_E$ Not defined since $v_D$ not defined. | x |
| 1 | 1 | 0 | 1 | 3rd rule: $v_C=v_D$; $r_C=r_D$<br>4th rule: if one and only one of A, B, C(D) uses same reference picture as E, then<br>$v_E=v_A$ or $v_B$ or $v_C$ (whichever uses same ref pic); else $v_E$=median($v_A$, $v_B$, $v_C$); [even if one or two of $v_A$, $v_B$ and $v_C$ use different reference pictures than $v_E$] | √ |
| 1 | 1 | 1 | 0 | 4th rule: if one and only one of A, B, C uses same reference picture as E, then<br>$v_E=v_A$ or $v_B$ or $v_C$ (whichever uses same ref pic); else $v_E$=median($v_A$, $v_B$, $v_C$) [even if one or two of $v_A$, $v_B$ and $v_C$ use different reference pictures than $v_E$] | √ |
| 1 | 1 | 1 | 1 | 4th rule: if one and only one of A, B, C uses same reference picture as E then<br>$v_E=v_A$ or $v_B$ or $v_C$ (whichever uses same ref pic); else $v_E$=median($v_A$, $v_B$, $v_C$); [even if one or two of $v_A$, $v_B$ and $v_C$ use different reference pictures than $v_E$] | √ |

Fig. 15

MVRules:
R0: Median rule is applied for Motion vector calculation: $M_E$=Median($M_A,M_B,M_C$)
R1: A, D outside of picture => $R_A = R_D = -1, M_A = M_D = 0$
R2: B, C, D outside of picture => $M_E = M_A$
R3: C not available (outside of picture, not yet coded etc) C is replaced by D
R4: if X is intra, then $R_X = -1$ (no definition on $M_X$ - code sets $R_X = -1, M_X = 0$)
R5: if $X(X \in \{A,B,C\})$ and only X has $R_X == R_E$ then $M_E = M_X$ Relationship between previous λ and current one.

| $QP$ | $\lambda_{I,P}^{Prev} = 5 \times \dfrac{QP+5}{34-QP} \times \exp^{\frac{QP}{10}}$ | $\lambda_{I,P}^{Curr} = 0.85 \times 2^{\frac{QP}{3}}$ | $\dfrac{\lambda_{I,P}^{Curr} - \lambda_{I,P}^{Prev}}{\lambda_{I,P}^{Curr}}$ |
|---|---|---|---|
| 16 | 28.89 | 34.27 | 18.61% |
| 17 | 35.42 | 43.18 | 21.90% |
| 18 | 43.48 | 54.40 | 25.11% |
| 19 | 53.49 | 68.54 | 28.14% |
| 20 | 65.97 | 86.35 | 30.89% |
| 21 | 81.66 | 108.80 | 33.23% |
| 22 | 101.53 | 137.08 | 35.01% |
| 23 | 126.94 | 172.71 | 36.05% |
| 24 | 159.84 | 217.60 | 36.14% |
| 25 | 203.04 | 274.16 | 35.03% |
| 26 | 260.86 | 345.42 | 32.42% |
| 27 | 340.11 | 435.20 | 27.96% |
| 28 | 452.23 | 548.32 | 21.25% |

Fig. 20

Performance different of Proposed Schemes/Draft text and proposed RDO vs current software (JM3.3)

| Scheme | Entropy | ref | Sequence | Foreman | Container | News | Paris | Silence | Mobile | Tempete |
|---|---|---|---|---|---|---|---|---|---|---|
| MVP | UVLC | 1 | PSNR gain | 0.190 | 0.076 | -0.027 | 0.270 | 0.099 | 0.220 | -0.135 |
| | | | Bitrate diff | 3.43% | 1.39% | -0.47% | 5.04% | 2.06% | 4.43% | -3.53% |
| | UVLC | 5 | PSNR gain | 0.221 | 0.037 | 0.004 | 0.318 | 0.129 | 0.256 | -0.156 |
| | | | Bitrate diff | 3.98% | 0.59% | 0.07% | 5.96% | 2.66% | 4.81% | -4.00% |
| MVP | CABAC | 1 | PSNR gain | 0.081 | 0.022 | -0.026 | 0.194 | 0.062 | 0.116 | -0.167 |
| | | | Bitrate diff | 1.52% | 0.40% | -0.45% | 3.65% | 1.25% | 2.32% | -4.32% |
| | CABAC | 5 | PSNR gain | 0.101 | 0.011 | 0.009 | 0.233 | 0.100 | 0.150 | -0.183 |
| | | | Bitrate diff | 1.89% | 0.21% | 0.14% | 4.37% | 2.04% | 2.93% | -4.70% |
| T+MVP | UVLC | 1 | PSNR gain | 0.020 | -0.006 | 0.010 | 0.001 | 0.004 | 0.001 | 0.004 |
| | | | Bitrate diff | 0.37% | -0.13% | 0.18% | 0.03% | 0.09% | 0.02% | 0.11% |
| | UVLC | 5 | PSNR gain | 0.063 | -0.009 | 0.025 | 0.016 | 0.033 | 0.015 | -0.028 |
| | | | Bitrate diff | 1.14% | -0.18% | 0.43% | 0.30% | 0.70% | 0.31% | -0.70% |
| T+MVP | CABAC | 1 | PSNR gain | 0.011 | -0.004 | 0.006 | 0.003 | -0.001 | 0.002 | 0.006 |
| | | | Bitrate diff | 0.20% | -0.08% | 0.09% | 0.06% | -0.01% | 0.05% | 0.16% |
| | CABAC | 5 | PSNR gain | 0.025 | -0.015 | 0.018 | 0.014 | 0.023 | 0.016 | -0.024 |
| | | | Bitrate diff | 0.47% | -0.27% | 0.31% | 0.27% | 0.48% | 0.34% | -0.62% |
| T+MVP RDO | UVLC | 1 | PSNR gain | 0.069 | 0.439 | 0.106 | 0.370 | 0.144 | 0.629 | 0.226 |
| | | | Bitrate diff | 1.26% | 8.27% | 1.87% | 6.81% | 2.96% | 12.15% | 5.48% |
| | UVLC | 5 | PSNR gain | 0.111 | 0.406 | 0.119 | 0.393 | 0.163 | 0.676 | 0.196 |
| | | | Bitrate diff | 2.00% | 7.53% | 2.07% | 7.29% | 3.33% | 12.19% | 4.66% |
| T+MVP RDO | CABAC | 1 | PSNR gain | 0.040 | 0.390 | 0.107 | 0.288 | 0.113 | 0.529 | 0.196 |
| | | | Bitrate diff | 0.73% | 7.26% | 1.80% | 5.36% | 2.29% | 10.32% | 4.79% |
| | CABAC | 5 | PSNR gain | 0.056 | 0.375 | 0.120 | 0.304 | 0.127 | 0.550 | 0.159 |
| | | | Bitrate diff | 1.05% | 6.91% | 1.97% | 5.64% | 2.59% | 10.40% | 3.82% |
| Draft | UVLC | 5 | PSNR gain | -0.012 | -0.047 | -0.018 | -0.003 | 0.000 | -0.080 | -0.120 |
| | | | Bitrate diff | -0.22% | -0.90% | -0.32% | 0.07% | 0.00% | -1.72% | -3.03% |
| | CABAC | 5 | PSNR gain | -0.003 | -0.042 | -0.016 | 0.000 | 0.004 | -0.067 | -0.112 |
| | | | Bitrate diff | -0.05% | -0.78% | -0.26% | -0.01% | 0.08% | -1.43% | -2.85% |

Fig. 21

Comparison of encoding performance for different values of $\lambda$.

| $\lambda$ | $QP_B$ | Sequence | Foreman | Container | News | Paris | Silence | Mobile | Tempete |
|---|---|---|---|---|---|---|---|---|---|
| 500 | $QP_P$ | PSNR | 0.128 | -0.015 | 0.084 | 0.117 | 0.039 | 0.280 | 0.156 |
| | | Bitrate | 3.43% | -0.33% | 2.01% | 2.85% | 1.06% | 6.35% | 3.89% |
| | $QP_P+1$ | PSNR | 0.102 | -0.111 | 0.057 | 0.048 | 0.005 | 0.133 | 0.094 |
| | | Bitrate | 2.58% | -2.78% | 1.39% | 1.19% | 0.16% | 3.04% | 2.35% |
| 700 | $QP_P$ | PSNR | 0.070 | 0.034 | 0.061 | 0.079 | 0.009 | 0.176 | 0.086 |
| | | Bitrate | 1.87% | 0.79% | 1.43% | 1.97% | 0.19% | 4.08% | 2.19% |
| | $QP_P+1$ | PSNR | 0.060 | -0.012 | 0.043 | 0.046 | 0.002 | 0.090 | 0.057 |
| | | Bitrate | 1.60% | -0.35% | 0.97% | 1.16% | 0.03% | 2.19% | 1.52% |

Fig. 22

TIMESTAMP-INDEPENDENT MOTION VECTOR PREDICTION FOR PREDICTIVE (P) AND BIDIRECTIONALLY PREDICTIVE (B) PICTURES

RELATED PATENT APPLICATIONS

This application is a continuation of and claims priority to U.S. patent application Ser. No. 10/620,320, titled "Timestamp-Independent Motion Vector Prediction for Predictive (P) and Bidirectionally Predictive (B) Pictures", filed Jul. 15, 2003, which: 1) is a continuation-in-part of co-pending U.S. patent application Ser. No. 10/444,511, filed May 23, 2003, and titled "Spatiotemporal Prediction for Bidirectionally Predictive (B) Pictures and Motion Vector Prediction For Multi-Picture Reference Motion Compensation", which is incorporated by reference in its entirety; 2) claimed the benefit of priority from, and incorporated by reference the entire disclosure of then co-pending U.S. Provisional Application for Letters Patent Ser. No. 60/397,187, filed Jul. 19, 2002, and titled "Timestamp Independent Motion Vector Prediction for P and B frames with Division Elimination"; and 3) is related to and incorporated by reference U.S. patent application Ser. No. 10/186,284, filed Jun. 27, 2002, and titled "Improved Video Coding Methods And Apparatuses".

TECHNICAL FIELD

This invention relates to video coding, and more particularly to methods and apparatuses for providing improved encoding/decoding and/or prediction techniques associated with different types of video data.

BACKGROUND

There is a continuing need for improved methods and apparatuses for compressing/encoding data and decompressing/decoding data, and in particular image and video data. Improvements in coding efficiency allow for more information to be processed, transmitted and/or stored more easily by computers and other like devices. With the increasing popularity of the Internet and other like computer networks, and wireless communication systems, there is a desire to provide highly efficient coding techniques to make full use of available resources.

Rate Distortion Optimization (RDO) techniques are quite popular in video and image encoding/decoding systems since they can considerably improve encoding efficiency compared to more conventional encoding methods.

The motivation for increased coding efficiency in video coding continues and has recently led to the adoption by a standard body known as the Joint Video Team (JVT), for example, of more refined and complicated models and modes describing motion information for a given macroblock into the draft international standard known as H.264/AVC. Here, for example, it has been shown that Direct Mode, which is a mode for prediction of a region of a picture for which motion parameters for use in the prediction process are predicted in some defined way based in part on the values of data encoded for the representation of one or more of the pictures used as references, can considerably improve coding efficiency of B pictures within the draft H.264/AVC standard, by exploiting the statistical dependence that may exist between pictures.

In the draft H.264/AVC standard as it existed prior to July of 2002, however the only statistical dependence of motion vector values that was exploited was temporal dependence which, unfortunately, implies that timestamp information for each picture must be available for use in both the encoding and decoding logic for optimal effectiveness. Furthermore, the performance of this mode tends to deteriorate as the temporal distance between video pictures increases, since temporal statistical dependence across pictures also decreases. Problems become even greater when multiple picture referencing is enabled, as is the case of H.264/AVC codecs.

Consequently, there is continuing need for further improved methods and apparatuses that can support the latest models and modes and also possibly introduce new models and modes to take advantage of improved coding techniques.

SUMMARY

Improved methods and apparatuses are provided that can support the latest models and modes and also new models and modes to take advantage of improved coding techniques.

The above stated needs and others are met, for example, by a method for use in encoding video data. The method includes establishing a first reference picture and a second reference picture for each portion of a current video picture to be encoded within a sequence of video pictures, if possible, and dividing each current video pictures into at least one portion to be encoded or decoded. The method then includes selectively assigning at least one motion vector predictor (MVP) to a current portion of the current video picture (e.g., in which the current picture is a coded frame or field). Here, a portion may include, for example, an entire frame or field, or a slice, a macroblock, a block, a subblock, a sub-partition, or the like within the coded frame or field. The MVP may, for example, be used without alteration for the formation of a prediction for the samples in the current portion of the current video frame or field. In an alternative embodiment, the MVP may be used as a prediction to which is added an encoded motion vector difference to form the prediction for the samples in the current portion of the current video frame or field.

For example, the method may include selectively assigning one or more motion parameter to the current portion. Here, the motion parameter is associated with at least one portion of the second reference frame or field and based on at least a spatial prediction technique that uses a corresponding portion and at least one collocated portion of the second reference frame or field. In certain instances, the collocated portion is intra coded or is coded based on a different reference frame or field than the corresponding current portion. The MVP can be based on at least one motion parameter of at least one portion adjacent to the current portion within the current video frame or field, or based on at least one direction selected from a forward temporal direction and a backward temporal direction associated with at least one of the portions in the first and/or second reference frames or fields. In certain implementations, the motion parameter includes a motion vector that is set to zero when the collocated portion is substantially temporally stationary as determined from the motion parameter(s) of the collocated portion.

The method may also include encoding the current portion using a Direct Mode scheme resulting in a Direct Mode encoded current portion, encoding the current portion using a Skip Mode scheme resulting in a Skip Mode encoded current portion, and then selecting between the Direct Mode encoded current frame and the Skip Mode encoded current frame. Similarly, the method may include encoding the current portion using a Copy Mode scheme based on a spatial prediction technique to produce a Copy Mode encoded current portion, encoding the current portion using a Direct Mode scheme based on a temporal prediction technique to produce a Direct Mode encoded current portion, and then selecting between the Copy Mode encoded current portion and the Direct Mode encoded current portion. In certain implementations, the decision process may include the use of a Rate Distortion Optimization (RDO) technique or the like, and/or user inputs.

The MVP can be based on a linear prediction, such as, e.g., an averaging prediction. In some implementations the MV is based on non-linear prediction such as, e.g., a median prediction, etc. The current picture may be encoded as a B picture (a picture in which some regions are predicted from an average of two motion-compensated predictors) or a P picture (a picture in which each region has at most one motion-compensated prediction), for example and a syntax associated with the current picture configured to identify that the current frame was encoded using the MVP.

BRIEF DESCRIPTION OF THE DRAWINGS

The present invention is illustrated by way of example and not limitation in the figures of the accompanying drawings. The same numbers are used throughout the figures to reference like components and/or features.

FIG. 3 is an illustrative diagram depicting Direct Prediction in B picture coding, in accordance with certain exemplary implementations of the present invention.

FIG. 4 is an illustrative diagram depicting handling of collocated Intra within existing codecs wherein motion is assumed to be zero, in accordance with certain exemplary implementations of the present invention.

FIG. 11 is a table listing some syntax changes that can be used in header information, in accordance with certain exemplary implementations of the present invention.

FIG. 15 is a table showing P-Picture Motion Vector prediction (e.g., Non-Skip, non-8×16, non-16×8 MBs), in accordance with certain exemplary implementations of the present invention.

FIG. 20 is a table showing the relationship between previous λ and current λ, in accordance with certain exemplary implementations of the present invention.

FIG. 21 is a table showing the performance difference of exemplary proposed schemes and proposed RDO versus conventional software (i.e., H.264/AVC JM3.3), in accordance with certain exemplary implementations of the present invention.

FIG. 22 is a table showing a comparison of encoding performance for different values of λ, in accordance with certain exemplary implementations of the present invention.

DETAILED DESCRIPTION

Figure 1:
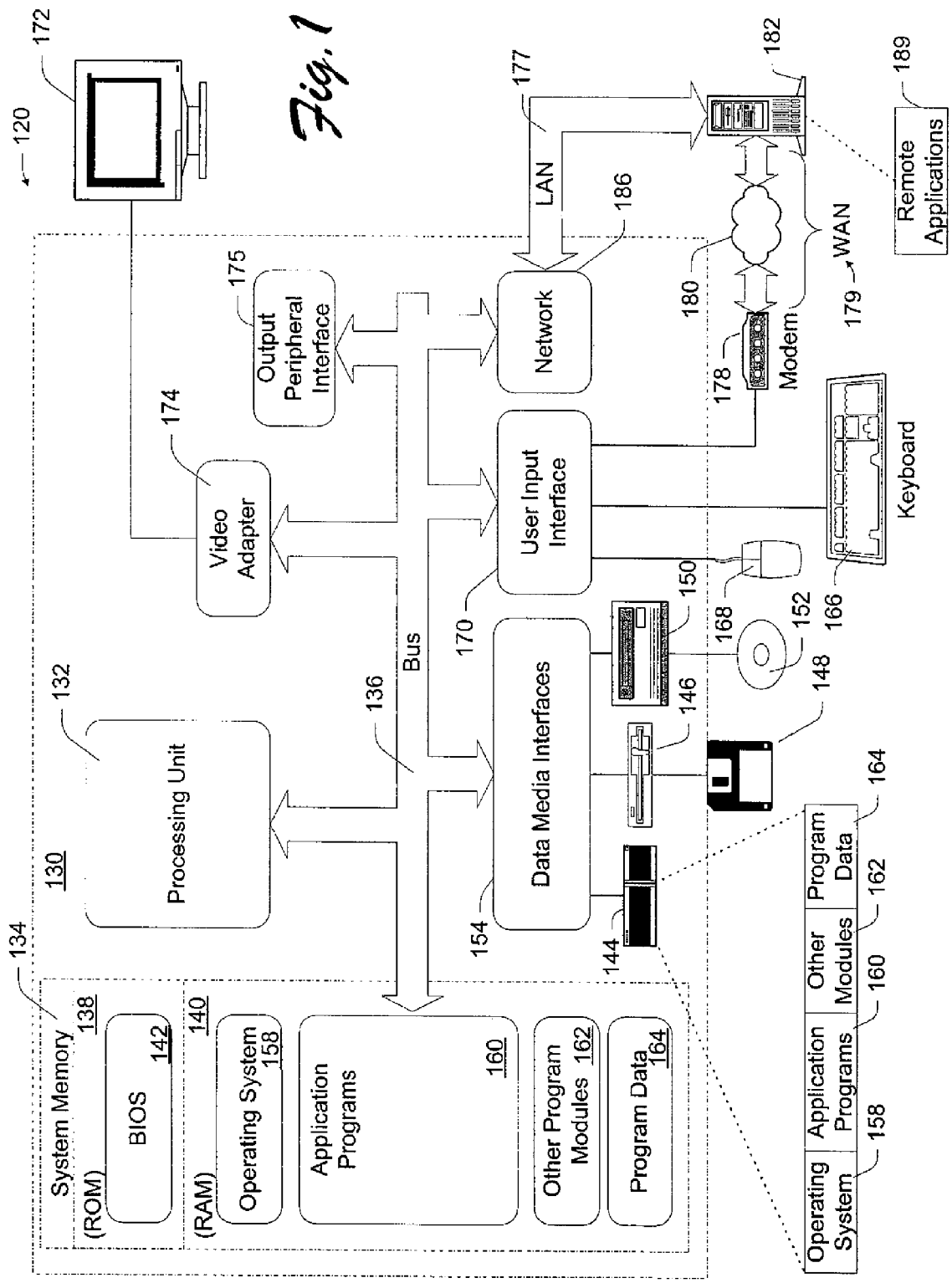
FIG. 1 is a block diagram depicting an exemplary computing environment that is suitable for use with certain implementations of the present invention.

While various methods and apparatuses are described and illustrated herein, it should be kept in mind that the techniques of the present invention are not limited to the examples described and shown in the accompanying drawings, but are also clearly adaptable to other similar existing and future video coding schemes, etc.

Before introducing such exemplary methods and apparatuses, an introduction is provided in the following section for suitable exemplary operating environments, for example, in the form of a computing device and other types of devices/appliances.

Exemplary Operational Environments:

Turning to the drawings, wherein like reference numerals refer to like elements, the invention is illustrated as being implemented in a suitable computing environment. Although not required, the invention will be described in the general context of computer-executable instructions, such as program modules, being executed by a personal computer.

Generally, program modules include routines, programs, objects, components, data structures, etc. that perform particular tasks or implement particular abstract data types. Those skilled in the art will appreciate that the invention may be practiced with other computer system configurations, including hand-held devices, multi-processor systems, microprocessor based or programmable consumer electronics, network PCs, minicomputers, mainframe computers, portable communication devices, and the like.

The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing environment 120 on which the subsequently described systems, apparatuses and methods may be implemented. Exemplary computing environment 120 is only one example of a suitable computing environment and is not intended to suggest any limitation as to the scope of use or functionality of the improved methods and systems described herein. Neither should computing environment 120 be interpreted as having any dependency or requirement relating to any one or combination of components illustrated in computing environment 120.

The improved methods and systems herein are operational with numerous other general purpose or special purpose computing system environments or configurations. Examples of well known computing systems, environments, and/or configurations that may be suitable include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 1, computing environment 120 includes a general-purpose computing device in the form of a computer 130. The components of computer 130 may include one or more processors or processing units 132, a system memory 134, and a bus 136 that couples various system components including system memory 134 to processor 132.

Bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 130 typically includes a variety of computer readable media. Such media may be any available media that is accessible by computer 130, and it includes both volatile and non-volatile media, removable and non-removable media.

In FIG. 1, system memory 134 includes computer readable media in the form of volatile memory, such as random access memory (RAM) 140, and/or non-volatile memory, such as read only memory (ROM) 138. A basic input/output system (BIOS) 142, containing the basic routines that help to transfer information between elements within computer 130, such as during start-up, is stored in ROM 138. RAM 140 typically contains data and/or program modules that are immediately accessible to and/or presently being operated on by processor 132.

Computer 130 may further include other removable/non-removable, volatile/non-volatile computer storage media. For example, FIG. 1 illustrates a hard disk drive 144 for reading from and writing to a non-removable, non-volatile magnetic media (not shown and typically called a "hard drive"), a magnetic disk drive 146 for reading from and writing to a removable, non-volatile magnetic disk 148 (e.g., a "floppy disk"), and an optical disk drive 150 for reading from or writing to a removable, non-volatile optical disk 152 such as a CD-ROM/R/RW, DVD-ROM/R/RW/+R/RAM or other optical media. Hard disk drive 144, magnetic disk drive 146 and optical disk drive 150 are each connected to bus 136 by one or more interfaces 154.

The drives and associated computer-readable media provide nonvolatile storage of computer readable instructions, data structures, program modules, and other data for computer 130. Although the exemplary environment described herein employs a hard disk, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 148, optical disk 152, ROM 138, or RAM 140, including, e.g., an operating system 158, one or more application programs 160, other program modules 162, and program data 164.

The improved methods and systems described herein may be implemented within operating system 158, one or more application programs 160, other program modules 162, and/or program data 164.

A user may provide commands and information into computer 130 through input devices such as keyboard 166 and pointing device 168 (such as a "mouse"). Other input devices (not shown) may include a microphone, joystick, game pad, satellite dish, serial port, scanner, camera, etc. These and other input devices are connected to the processing unit 132 through a user input interface 170 that is coupled to bus 136, but may be connected by other interface and bus structures, such as a parallel port, game port, or a universal serial bus (USB).

A monitor 172 or other type of display device is also connected to bus 136 via an interface, such as a video adapter 174. In addition to monitor 172, personal computers typically include other peripheral output devices (not shown), such as speakers and printers, which may be connected through output peripheral interface 175.

Computer 130 may operate in a networked environment using logical connections to one or more remote computers, such as a remote computer 182. Remote computer 182 may include many or all of the elements and features described herein relative to computer 130.

Logical connections shown in FIG. 1 are a local area network (LAN) 177 and a general wide area network (WAN) 179. Such networking environments are commonplace in offices, enterprise-wide computer networks, intranets, and the Internet.

When used in a LAN networking environment, computer 130 is connected to LAN 177 via network interface or adapter 186. When used in a WAN networking environment, the computer typically includes a modem 178 or other means for establishing communications over WAN 179. Modem 178, which may be internal or external, may be connected to system bus 136 via the user input interface 170 or other appropriate mechanism.

Depicted in FIG. 1, is a specific implementation of a WAN via the Internet. Here, computer 130 employs modem 178 to establish communications with at least one remote computer 182 via the Internet 180.

In a networked environment, program modules depicted relative to computer 130, or portions thereof, may be stored in a remote memory storage device. Thus, e.g., as depicted in FIG. 1, remote application programs 189 may reside on a memory device of remote computer 182. It will be appreciated that the network connections shown and described are exemplary and other means of establishing a communications link between the computers may be used.

Figure 2:
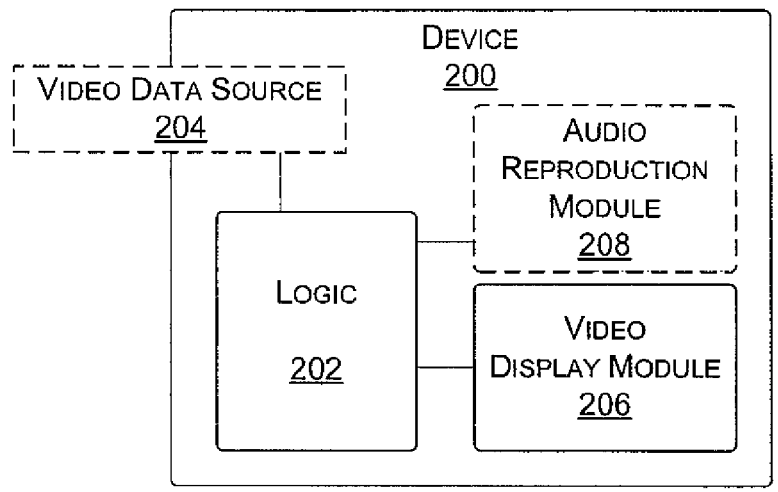
FIG. 2 is a block diagram depicting an exemplary representative device that is suitable for use with certain implementations of the present invention.

Attention is now drawn to FIG. 2, which is a block diagram depicting another exemplary device 200 that is also capable of benefiting from the methods and apparatuses disclosed herein. Device 200 is representative of any one or more devices or appliances that are operatively configured to process video and/or any related types of data in accordance with all or part of the methods and apparatuses described herein and their equivalents. Thus, device 200 may take the form of a computing device as in FIG. 1, or some other form, such as, for example, a wireless device, a portable communication device, a personal digital assistant, a video player, a television, a DVD player, a CD player, a karaoke machine, a kiosk, a digital video projector, a flat panel video display mechanism, a set-top box, a video game machine, etc. In this example, device 200 includes logic 202 configured to process video data, a video data source 204 configured to provide video data to logic 202, and at least one display module 206 capable of displaying at least a portion of the video data for a user to view. Logic 202 is representative of hardware, firmware, software and/or any combination thereof. In certain implementations, for example, logic 202 includes a compressor/decompressor (codec), or the like. Video data source 204 is representative of any mechanism that can provide, communicate, output, and/or at least momentarily store video data suitable for processing by logic 202. Video reproduction source is illustratively shown as being within and/or without device 200. Display module 206 is representative of any mechanism that a user might view directly or indirectly and see the visual results of video data presented thereon. Additionally, in certain implementations, device 200 may also include some form or capability for reproducing or otherwise handling audio data associated with the video data. Thus, an audio reproduction module 208 is shown.

With the examples of FIG. 1 and FIG. 2 in mind, and others like them, the next sections focus on certain exemplary methods and apparatuses that may be at least partially practiced using with such environments and with such devices.

Conventional Direct Mode coding typically considerably improves coding efficiency of B frames by exploiting the statistical dependence that may exist between video frames. For example, Direct Mode can effectively represent block motion without having to transmit motion information. The statistical dependence that has been exploited thus far has been temporal dependence, which unfortunately implies that the timestamp information for each frame has to be available in both the encoder and decoder logic. Furthermore, the performance of this mode tends to deteriorate as the distance between frames increases since temporal statistical dependence also decreases. Such problems become even greater when multiple frame referencing is enabled, for example, as is the case of the H.264/AVC codec.

In this description improved methods and apparatuses are presented for calculating direct mode parameters that can achieve significantly improved coding efficiency when compared to current techniques. The improved methods and apparatuses also address the timestamp independency issue, for example, as described above. The improved methods and apparatuses herein build upon concepts that have been successfully adopted in P frames, such as, for example, for the encoding of a skip mode and exploiting the Motion Vector Predictor used for the encoding of motion parameters within the calculation of the motion information of the direct mode. An adaptive technique that efficiently combines temporal and spatial calculations of the motion parameters has been separately proposed.

In accordance with certain aspects of the present invention, the improved methods and apparatuses represent modifications, except for the case of the adaptive method, that do not require a change in the draft H.264/AVC bitstream syntax as it existed prior to July of 2002, for example. As such, in certain implementations the encoder and decoder region prediction logic may be the only aspects in such a standards-based system that need to be altered to support the improvements in compression performance that are described herein.

In terms of the use of these principles in a coding scheme such as the draft H.264/AVC standard, for example, other possible exemplary advantages provided by the improved methods and apparatuses include: timestamp independent calculation of direct parameters; likely no syntax changes; no extensive increase in complexity in the encoder logic and/or decoder logic; likely no requirement for (time-consuming/processor intensive) division in the calculations; considerable reduction of memory needed for storing motion parameters; relatively few software changes (e.g., when the motion vector prediction for 16×16 mode is reused); the overall compression-capability performance should be very close or considerably better than the direct mode in the H.264/AVC standard (software) as it existed prior to July of 2002; and enhanced robustness to unconventional temporal relationships with reference pictures since temporal relationship assumptions (e.g., such as assumptions that one reference picture for the coding of a B picture is temporally preceding the B picture and that the other reference picture for the coding of a B picture is temporally following the B picture) can be avoided in the MV prediction process.

In accordance with certain other aspects of the present invention, improvements on the current Rate Distortion Optimization (RDO) for B frames are also described herein, for example, by conditionally considering the Non-Residual Direct Mode during the encoding process, and/or by also modifying the Lagrangian λ parameter of the RDO. Such aspects of the present invention can be selectively combined with the improved techniques for Direct Mode to provide considerable improvements versus the existing techniques/systems.

Attention is drawn now to FIG. 3, which is an illustrative diagram depicting Direct Prediction in B frame coding, in accordance with certain exemplary implementations of the present invention.

The introduction of the Direct Prediction mode for a Macroblock/block within B frames, for example, is one of the main reasons why B frames can achieve higher coding efficiency, in most cases, compared to P frames. According to this mode as in the draft H.264/AVC standard, no motion information is required to be transmitted for a Direct Coded Macroblock/block, since it can be directly derived from previously transmitted information. This eliminates the high overhead that motion information can require. Furthermore, the direct mode exploits bidirectional prediction which allows for further increase in coding efficiency. In the example shown in FIG. 3, a B frame picture is coded with use of two reference pictures, a backward reference picture that is a P frame at a time t+2 that is temporally subsequent to the time t+1 of the B frame and a forward reference picture that is a P frame at a time t that is temporally previous to the B frame. It shalt be appreciated by those familiar with the art that the situation shown in FIG. 3 is only an example, and in particular that the terms "forward" and "backward" may be used to apply to reference pictures that have any temporal relationship with the picture being coded (i.e., that a "backward" or "forward" reference picture may be temporally prior to or temporally subsequent to the picture being coded).

Motion information for the Direct Mode as in the draft H.264/AVC standard as it existed prior to July 2002 is derived by considering and temporally scaling the motion parameters of the collocated macroblock/block of the backward reference picture as illustrated in FIG. 3. Here, an assumption is made that an object captured in the video picture is moving with constant speed. This assumption makes it possible to predict a current position inside a B picture without having to transmit any motion vectors. By way of example, the motion vectors ($\overrightarrow{MV}_{fw}, \overrightarrow{MV}_{bw}$) of the Direct Mode versus the motion vector $\overrightarrow{MV}$ of the collocated block in the first backward reference frame can be calculated by:

$$\overrightarrow{MV}_{fw} = \frac{TR_B}{TR_D} \times \overrightarrow{MV} \text{ and } \overrightarrow{MV}_{bw} = \frac{(TR_B - TR_D)}{TR_D} \times \overrightarrow{MV}, \quad (1)$$

where $TR_B$ is the temporal distance between the current B frame and the T reference frame pointed by the forward MV of the collocated MB, and $TR_D$ is the temporal distance between the backward reference frame and the reference frame pointed by the forward MV of the collocated region in the backward reference frame. The same reference frame that was used by the collocated block was also used by the Direct Mode block. Until recently, for example, this was also the method followed within the work on the draft H.264/AVC standard, and still existed within the latest H.264/AVC reference software prior to July of 2002 (see, e.g., H.264/AVC Reference Software, unofficial software release Version 3.7).

As demonstrated by the example in FIG. 3 and the scaling equation (1) above, the draft H.264/AVC standard as it existed prior to July of 2002 and other like coding methods present certain drawbacks since they usually require that both the encoder and decoder have a priori knowledge of the timestamp information for each picture. In general, and especially due to the design of H.264/AVC which allows reference pictures almost anywhere in time, timestamps cannot be assumed by the order that a picture arrives at the decoder. Current designs typically do not include precise enough timing information in the syntax to solve this problem. A relatively new scheme was also under investigation for work on H.264/AVC, however, which in a sense does not require the knowledge of time. Here, the new H.264/AVC scheme includes three new parameters, namely, direct_mv_scale_fwd, direct_mv_scale_bwd, and direct_mv_divisor to the picture header and according to which the motion vectors of the direct mode can be calculated as follows:

$$\overrightarrow{MV}_{fw} = \frac{direct\_mv\_scale\_fwd}{direct\_mv\_divisor} \times \overrightarrow{MV} \quad (2)$$

-continued
$$\overrightarrow{MV}_{bw} = \frac{direct\_mv\_scale\_bwd}{direct\_mv\_divisor} \times \overrightarrow{MV}$$

Reference is now made to FIG. 4, which is an illustrative diagram depicting handling of collocated Intra within existing codecs wherein motion is assumed to be zero, in accordance with certain exemplary implementations of the present invention.

Figure 5:
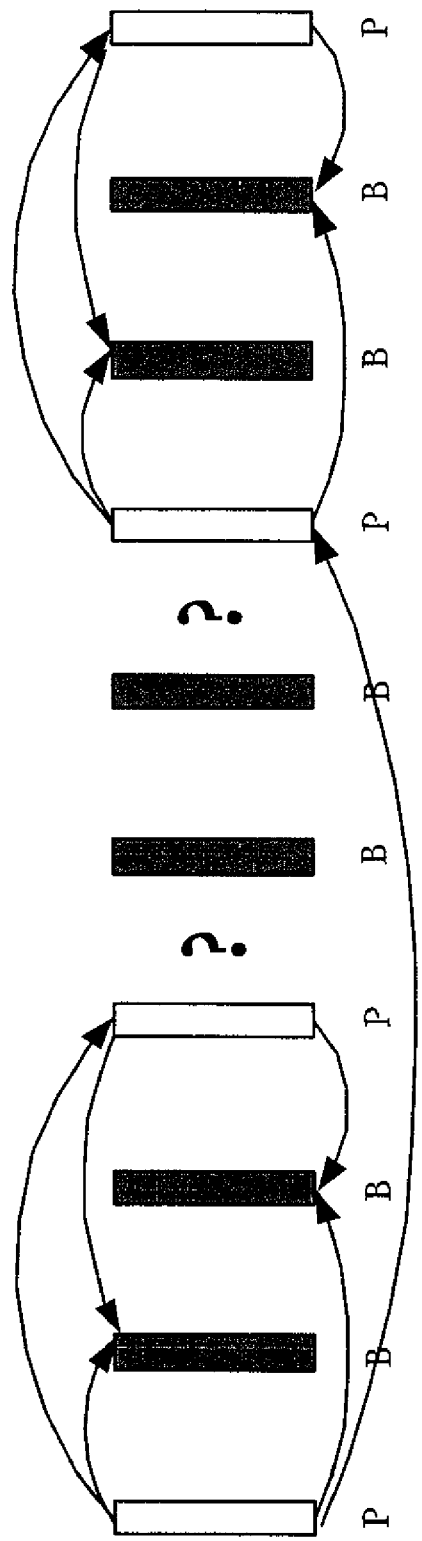
FIG. 5 is an illustrative diagram demonstrating that Direct Mode parameters need to be determined when the reference picture index of the collocated block in the backward reference P picture is other than zero, in accordance with certain exemplary implementations of the present invention.

Reference is made next to FIG. 5, which is an illustrative diagram demonstrating that Direct Mode parameters need to be determined when the reference frame used to code the collocated block in the backward reference P picture is not the most recent reference picture that precedes the B picture to be coded (e.g., when the reference index is not equal to zero if the value zero for a reference index indicates the most recent temporally-previous forward reference picture). The new H.264/AVC scheme described above unfortunately has itself several drawbacks. For example, the H.264/AVC standard allows for multiple frame referencing and long-term storage of pictures as illustrated in FIG. 5. The new H.264/AVC scheme above fails to consider that different reference frames require different scaling factors. As such, for example, a significant reduction in coding efficiency has been reported (e.g., up to 10% loss in B frame coding efficiency). It is also quite uncertain what exactly the temporal relationship might be between the current block and its collocated block in such a case since the constant motion assumption described above is no longer followed. Additionally, temporal statistical relationships are reduced even further as reference frames become more temporally distant compared to one another.

Figure 6:
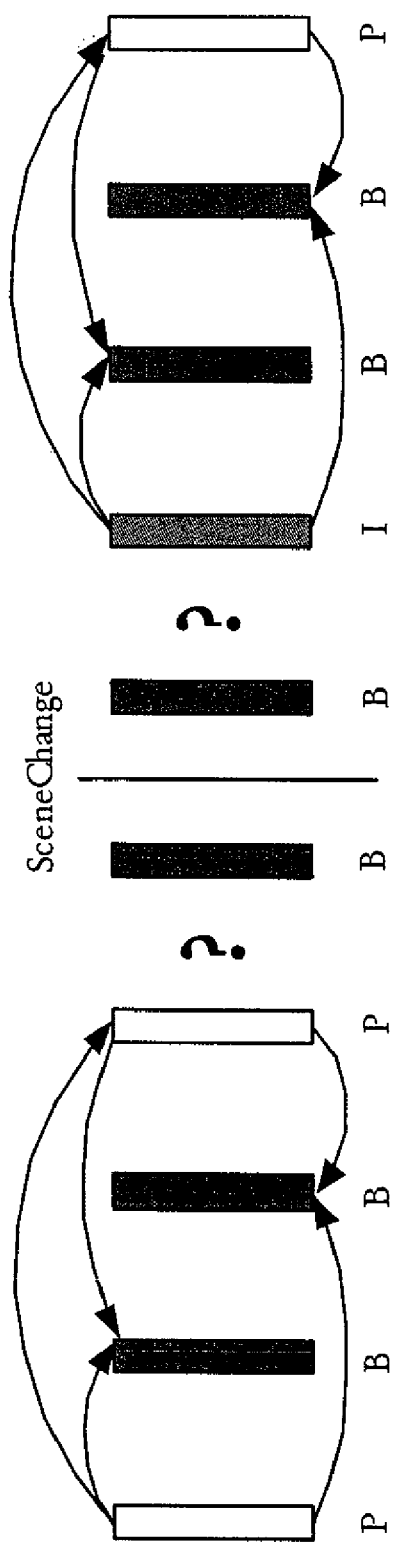
FIG. 6 is an illustrative diagram showing a scene change and/or the situation wherein the collocated block is intra-coded, in accordance with certain exemplary implementations of the present invention.

Other issues include the inefficiency of the above new H.264/AVC scheme to handle intra blocks as shown in FIG. 4, for example, and/or even intra pictures. such as, for example, in the case of a scene change as shown in FIG. 6, which is an illustrative diagram showing a scene change and/or the situation wherein the collocated block is intra-coded. Currently, for example, a typically codec would assume that motion information is zero and use the first backward and forward reference pictures to perform bidirectional motion compensation. In this example, it may be more likely that the two collocated blocks from the forward and backward references have little, if any, relationship. Therefore, the usage of intra coding in the backward reference picture (shown as picture I in FIG. 6) in this case would likely cause a significantly reduction in the coding efficiency for the coding of the B pictures neighboring the scene change.

In the case of a scene change, for example, as in FIG. 6, where there is obviously no relationship between the two reference frames, a bidirectional prediction would usually provide no benefit. This implies that the Direct Mode, as previously defined, could be completely wasted. Unfortunately, current implementations of the Direct Mode usually are defined to always perform bidirectional prediction of a Macroblock/block.

Even if temporal distance parameters were available, it is not certain that the usage of the Direct Mode as conventionally defined is the most appropriate solution. In particular, for B frames that are temporally closer to a first temporally-previous forward reference frame, the statistical dependence might be much stronger with that frame than it would be for a temporally-subsequent backward reference frame. One example is a sequence where scene A changes to scene B, and then moves back to scene A (e.g., as might be the case in a news bulletin). The resulting performance of B frame encoding would likely suffer since Direct Mode will not be effectively exploited within the encoding process.

Unlike the conventional definitions of the Direct Mode where only temporal prediction was used, in co-pending patent application Ser. No. 10/444,511, which is incorporated herein by reference, several alternative improved methods and apparatuses are described for the assignment of the Direct Mode motion parameters wherein both temporal and/or spatial prediction are considered.

With these schemes and concepts in mind, in accordance with certain aspects of the present invention, presented below are some exemplary adaptive methods and apparatuses-that combine such schemes and/or improve upon them to achieve even better coding performance under various conditions.

By way of example, in certain methods and apparatuses described below a high degree of statistical dependence of the motion parameters of adjacent macroblocks is exploited in order to further improve the efficiency of the SKIP Macroblock Mode for P pictures. For example, efficiency can be increased by allowing the SKIP mode to also use motion parameters, taken as the Motion Vector Predictor parameters of a current (16×16) Inter Mode. The same technique may also apply for B frames, wherein one may also generate both backward and forward motion vectors for the Direct mode using the Motion Vector Predictor of the backward or forward (16×16) Inter modes, respectively. It is also noted, for example, that one may even refine this prediction to other levels (e.g., 8×8, 4×4, etc.), however doing so would typically complicate the design.

In accordance with certain exemplary implementations of the present invention methods and apparatuses are provided to correct at least some of the issues presented above, such as, for example, the case of the collocated region in the backward reference picture using a different reference frame than the current picture will use and/or being intra coded. In accordance with certain other exemplary implementations of the present invention methods and apparatuses are provided which use a spatial-prediction based Motion Vector Predictor (MVP) concept to provide other benefits to the direct mode, such as, for example, the removal of division processing and/or memory reduction.

Figure 7:
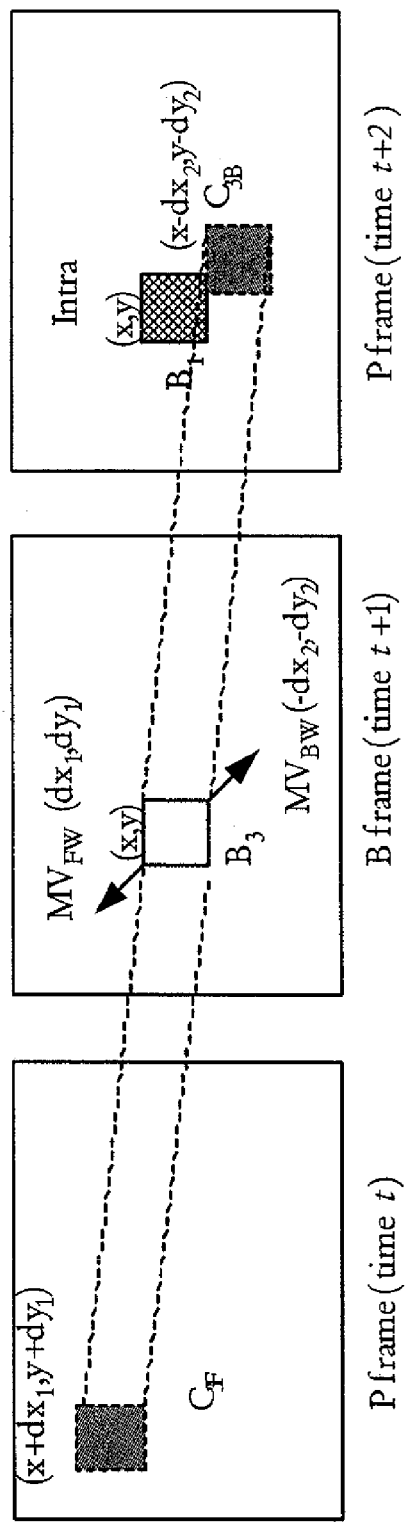
FIG. 7 is an illustrative diagram depicting a scheme wherein $MV_{FW}$ and $MV_{BW}$ are derived from spatial prediction (e.g., Median MV of surrounding Macroblocks) and wherein if either one is not available (e.g., no predictors) then one-direction may be used, in accordance with certain exemplary implementations of the present invention.

Direct Mode with INTRA and Non-Zero Reference Correction:

FIG. 7 is an illustrative diagram depicting a scheme wherein $MV_{FW}$ and $MV_{BW}$ are derived from spatial prediction (e.g., Median MV of forward and/or backward motion vector values of surrounding Macroblocks that use the same reference index) and wherein if either one is not available (e.g., no predictors) then one-direction prediction (e.g., forward-only prediction or backward-only prediction) may be used, in accordance with certain exemplary implementations of the present invention.

In accordance with certain exemplary methods, if a collocated block in the backward reference picture uses a zero-reference frame index and if also its reference picture exists in the reference buffer for the decoding process of the current picture to be decoded, then a scheme, such as, demonstrated above using equation (2) or the like is followed. Otherwise, a spatial-prediction based Motion Vector Predictor (MVP) for both directions (forward and backward) is used instead. By way of example, in the case of a collocated block being intra-coded or having a different reference frame index than the reference frame index to be used for the block of the current picture, or even the reference frame not being available anymore, then spatial-prediction MVP is used.

The spatial-prediction MVP can be taken, for example, as the motion vector predicted for the encoding of the current (16×16) Inter Mode (e.g., essentially with the usage of MEDIAN prediction or the like). This method in certain implementations is further modified by using different sized block or portions. For example, the method can be refined by using smaller block sizes. However, this tends to complicate the design sometimes without as much compression gain improvement. For the case of a Direct sub-partition within a P8×8 structure, for example, this method may still use a 16×16 MVD, even though this could be corrected to consider surrounding blocks.

Unlike the case of Skip Mode in a P picture, in accordance with certain aspects of the present invention, the motion vector predictor is not restricted to use exclusively the zero reference frame index. Here, for example, an additional Reference Frame Prediction process may be introduced for selecting the reference frame that is to be used for either the forward or backward reference. Those skilled in the art will recognize that this type of prediction may also be applied in frames as well.

If no reference exists for prediction (e.g., the surrounding Macroblocks are using forward prediction and thus there exists no backward reference), then the direct mode can be designed such that it becomes a single direction prediction mode. This consideration can potentially solve several issues such as inefficiency of the H.264/AVC scheme prior to July of 2002 in scene changes, when new objects appear within a scene, etc. This method also solves the problem of both forward and backward reference indexes pointing to temporally-future reference pictures or both pointing to temporally-subsequent reference pictures, and/or even when these two reference pictures are the same picture altogether.

Figure 8:
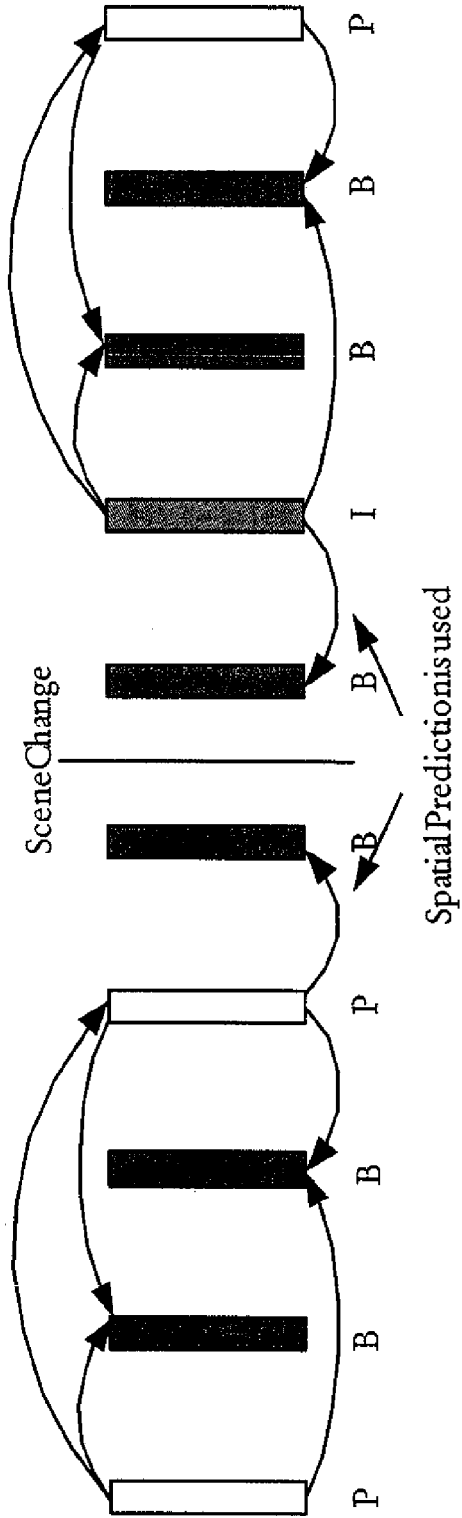
FIG. 8 is an illustrative diagram depicting how spatial prediction may be employed to solve the problem of scene changes and/or that Direct Mode need not be restricted to being Bidirectional, in accordance with certain exemplary implementations of the present invention.

For example, attention is drawn to FIG. 8, which is an illustrative diagram depicting how spatial prediction may be employed to solve the problem of scene changes and/or that Direct Mode need not be restricted to being Bidirectional, in accordance with certain exemplary implementations of the present invention. Here, as described above and illustrated, the Direct Mode need not necessarily be bidirectional.

Presented below is exemplary pseudocode for such a method. In this pseudo-code, it is assumed that the value −1 is used for a reference index to indicate a non-valid index (such as the reference index of an intra region) and it is assumed that all values of reference index are less than 15, and it is assumed that the result of an "&" operation applied between the number −1 and the number 15 is equal to 15 (as is customary in the C programming language). It is further assumed that a function SpatialPredictor(Bsize,X,IndexVal) is defined to provide a motion vector prediction for a block size Bsize for use in a prediction of type X (where X is either FW, indicating forward prediction or BW, indicating backward prediction) for a reference picture index value IndexVal. It is further assumed that a function min(a,b,c) is defined to provide the minimum of its arguments a, b, and c. It is further assumed for the purpose of this example that the index value 0 represents the index of the most commonly-used or most temporally closest reference picture in the forward or backward reference picture list, with increasing values of index being used for less commonly-used or temporally more distant reference pictures.

```
Direct_MV_Calculation( )
{
    if (CollocatedRegionRefIndex!=0)
    {
        // Note that UpRight can be replaced by UpLeft at frame
```

-continued

```
boundaries
FwReferenceIndex=min(referenceBfwLeft&15,referenceBfwUp&15,
referenceBfwUpRight&15);
BwReferenceIndex=min(referenceBbwLeft&15,referenceBbwUp&15,
referenceBbwUpRight&15)
            if FwReferenceIndex!=15
            {
              DirectMVfw=SpatialPredictor(16x16,FW,FwReference
              Index); referenceIndexBfw=FwReferenceIndex;
            }
            else
            {
              DirectMVfw=0;
              referenceIndexBfw= -1;
            }
            if BwReferenceIndex!=15
            {
              DirectMVbw=SpatialPredictor(16x16,BW,BwReference
              Index); referenceIndexBbw=BwReferenceIndex;
            }
            else
            {
              DirectMVbw=0;
              referenceIndexBbw= -1;
            }
            if (BwReferenceIndex==15 && FwReferenceIndex==15)
                referenceIndexBbw=referenceIndexBfw=0;
        }
        else // Perform Prediction using temporal information
        {
DirectMVfw=direct_mv_scale_fwd*MvP/direct_mv_scale_divisor;
DirectMVbw=direct_mv_scale_bwd*MvP/direct_mv_scale_divisor;
            referenceIndexBfw=0;
            referenceIndexBbw=0;
        }
    }
```

In the above algorithm, if the collocated block in the backward reference picture uses the zero-index reference frame (e.g., CollocatedRegionRefIndex=0), and the temporal prediction MVs are calculated for both backward and forward prediction as the equation (2); otherwise the spatial MV prediction is used instead. For example, the spatial MV predictor first examines the reference indexes used for the left, up-left and up-right neighboring macroblocks and finds the minimum index value used both forward and backward indexing. If, for example, the minimum reference index is not equal to 15 (Fw/BwReferenceIndex=15 means that all neighboring macroblocks are coded with Intra), the MV prediction is calculated from spatial neighboring macroblocks. If the minimum reference index is equal to 15, then the MV prediction is zero.

The above method may also be extended to interlaced frames and in particular to clarify the case wherein a backward reference picture is coded in field mode, and a current picture is coded in frame mode. In such a case, if the two fields have different motion or reference frame, they complicate the design of direct mode with the original description. Even though averaging between fields could be applied, the usage of the MVP immediately solves this problem since there is no dependency on the frame type of other frames. Exceptions in this case might include, however, the case where both fields have the same reference frame and motion information.

Figure 23:
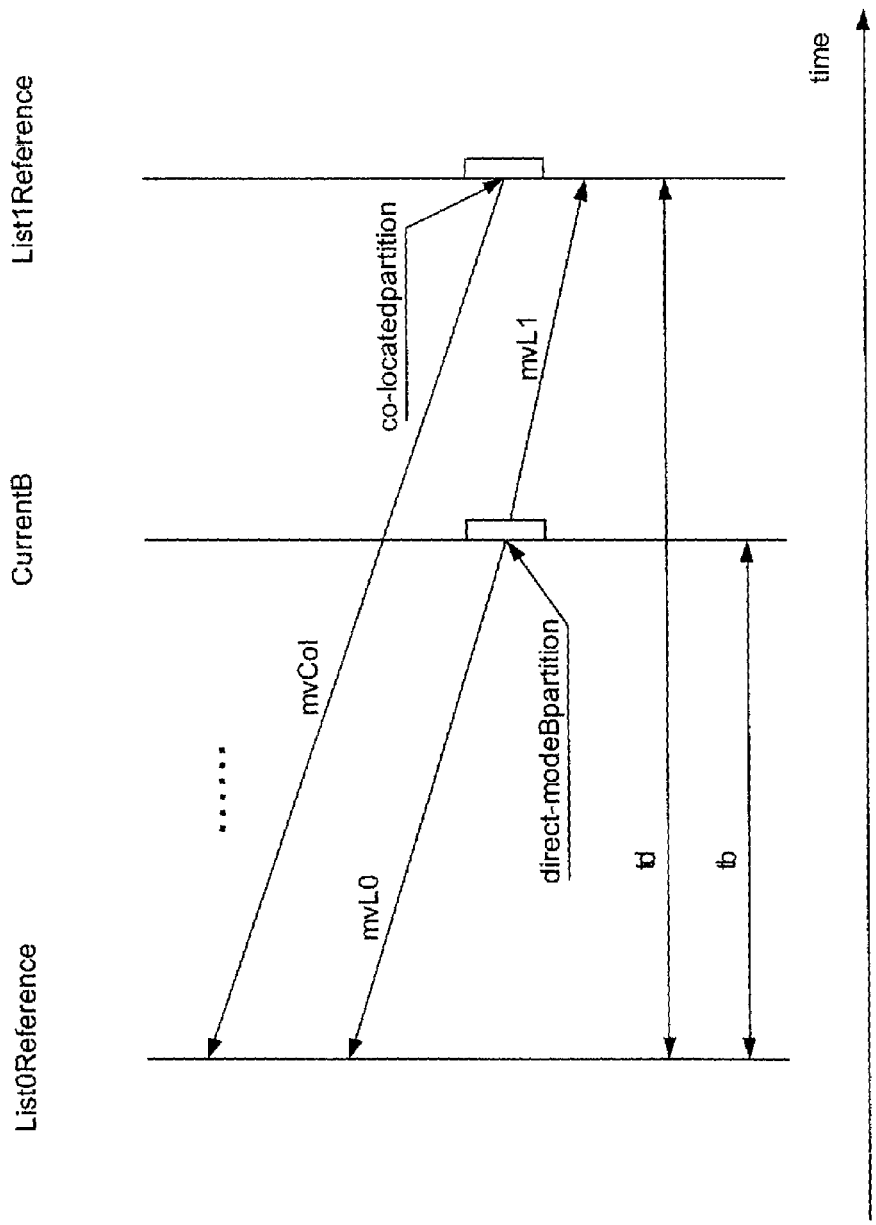
FIG. 23 is an illustrative timeline showing a situation wherein reference pictures of a macroblock partition temporally precede a current picture, in accordance with certain exemplary implementations of the present invention.

In addition, in the new H.264/AVC standard the B frame does not constrain its two references to be one from a previous frame and one from a subsequent frame. As shown in the illustrative timeline in FIG. 23, both reference pictures (forward and backward, also known as List 0 and List 1) of a macroblock partition may precede a current picture in temporal order. The methods and apparatuses provided herein are also suitable for use in this case. Alternatively, both reference pictures may be temporally subsequent to a current picture. Thus, usage of MVP does not depend on the order of references.

Division Free, Timestamp independent Direct Mode:

In the exemplary method above, the usage of the spatial-prediction based MVP for some specific cases solves various prediction problems in the current direct mode design. There still remain, however, several issues that are addressed in this section. For example, by examining equation (2) above, one observes that the calculation of the direct mode parameters requires a rather computationally expensive division process (for both horizontal and vertical motion vector components). This division process needs to be performed for every Direct Coded subblock. Even with the improvements in processing technology, division tends to be a highly undesirable operation, and while shifting techniques can help it is usually more desirable to remove as much use of the division calculation process as possible.

Furthermore, the computation above also requires that the entire motion field (including reference frame indexes) of the first backward reference picture be stored in both the encoder and decoder. Considering, for example, that blocks in H.264/AVC may be of 4×4 size, storing this amount of information may become relatively expensive as well.

Figure 9:
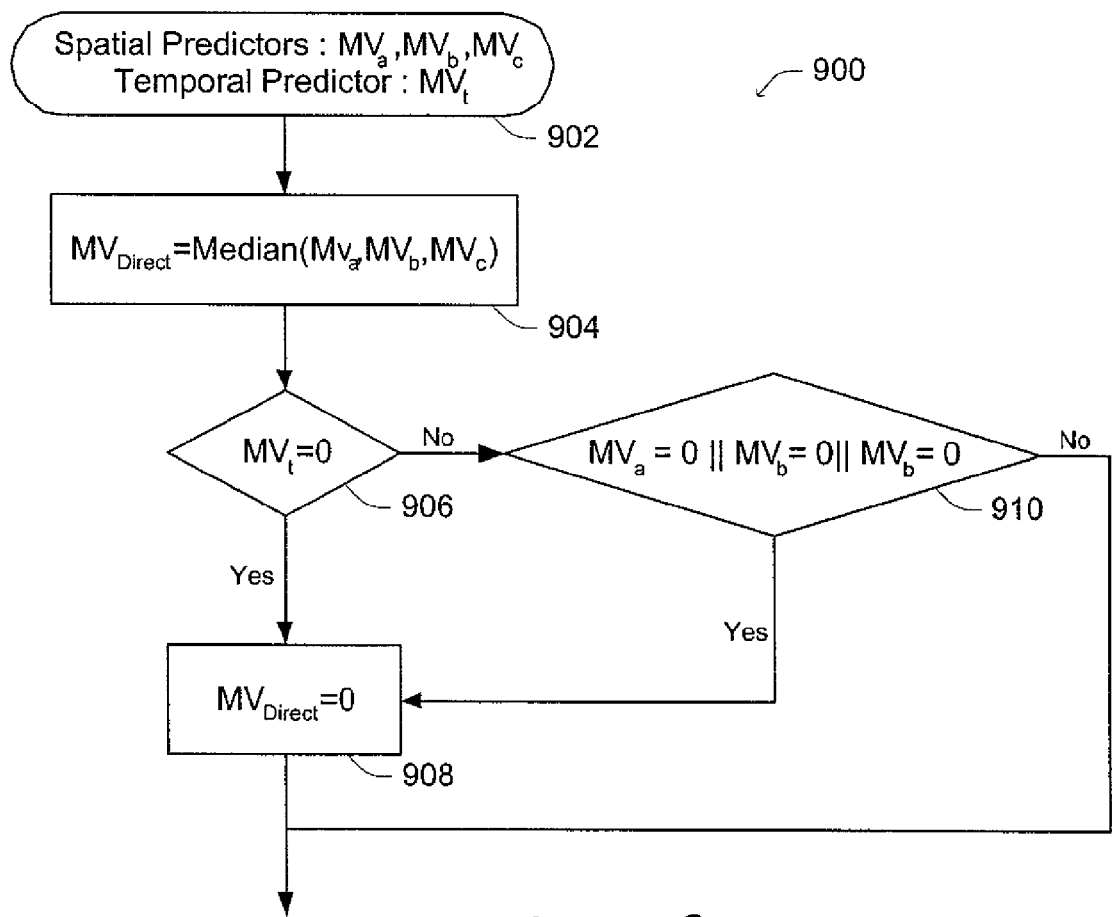
FIG. 9 is an illustrative diagram depicting Timestamp Independent SpatioTemporal Prediction for Direct Mode, in accordance with certain exemplary implementations of the present invention.

With such concerns in mind, attention is drawn to FIG. 9, which is a flow diagram depicting an exemplary method 900 for Timestamp Independent SpatioTemporal Prediction for Direct Mode, in accordance with certain exemplary implementations of the present invention. Here, in act 902, spatial predictors $MV_a$, $MV_b$, and $MV_c$ are provided/determined along with temporal predictor $MV_t$. In act 904, $MV_{Direct}$ is determined, in this example, as the Median of $MV_a$, $MV_b$, and $MV_c$. In act 906 it is determined if $MV_t$ is zero, and if so, then method 900 continues with act 908, otherwise method 900 continues with act 910. In act 908, $MV_{Direct}$ is set to zero and the method ends with this being the output. In act 910, it is determined if $MV_a=0 || MV_b=0 || MV_c=0$, if so, then according to act 908 $MV_{Direct}$ is set to zero and the method ends with this being the output, otherwise, then $MV_{Direct}$ remains as set in act 904 and the method ends with this being the output.

Those skilled in the art will recognize that other suitable linear and/or non-linear functions may be substituted for the exemplary Median function in act 904.

The usage of the spatial-prediction based MVP though does not require any such operation or memory storage. Thus, it is recognized that using the spatial-prediction based MVP for all cases, regardless of the motion information in the collocated block of the first backward reference picture may reduce if not eliminate many of these issues.

Even though one may disregard motion information from the collocated block, in the present invention it was found that higher efficiency is usually achieved by also considering whether the collocated block is stationary and/or better, close to stationary. In this case motion information for the direct mode may also be considered to be zero as well. Only the directions that exist, for example, according to the Reference Frame Prediction, need be used. This concept tends to protect stationary backgrounds, which, in particular at the edges of moving objects, might become distorted if these conditions are not introduced. Storing this information requires much less memory since for each block only 1 bit needs to be stored (to indicate zero/near-zero vs. non-zero motion for the block).

By way of further demonstration of such exemplary techniques, the following pseudocode is presented:

```
Direct_MV_Calculation( )
{
    // Note that UpRight can be replaced by UpLeft at frame boundaries
    FwReferenceIndex=min(referenceBfwLeft&15,referenceBfwUp&15,
    referenceBfwUpRight&15);
    BwReferenceIndex=min(referenceBbwLeft&15,referenceBbwUp&15,
    referenceBbwUpRight&15)
        if FwReferenceIndex!=15
        {
            if (!CollocatedRegionRefIndex && (!(abs(MvPx)>>1))&&
(!(abs(MvPy)>>1)) // Examine if stationary collocated
            {
                DirectMVfw=0;
                referenceIndexBfw=0;
            }
            else
            {
                DirectMVfw=SpatialPredictor(16x16,FW,FwReferenceIndex);
                referenceIndexBfw=FwReferenceIndex;
            }
        }
        else
        {
            DirectMVfw=0;
            referenceIndexBfw=-1;
        }
        if BwRefereneeIndex!=15
        {
            if (!CollocatedRegionRefIndex && (!(abs(MvPx)>>1))&&
(!(abs(MvPy)>>1)) // Examine if stationary collocated
            {
                DirectMVbw=0;
                referenceIndexBbw=0;
            }
            else
            {
DirectMVbw=SpatialPredictor(16x16,BW,BwReferenceIndex);
                referenceIndexBbw=BwReferenceIndex;
            }
        }
        else
        {
            DirectMVbw=0;
            referenceIndexBbw=-1;
        }
        if (BwReferenceIndex==15 && FwReferenceIndex==15)
            referenceIndexBbw=referenceIndexBfw=0;
}
```

In the above, the MV predictor directly examines the references of neighboring blocks and finds the minimum reference in both the forward and backward reference picture lists. Then, the same process is performed for the selected forward and backward reference index. If, for example, the minimum reference index is equal to 15, e.g., all neighboring blocks are coded with Intra, the MV prediction is zero. Otherwise, if the collocated block in the first backward reference picture uses a zero-reference frame index and has zero or very close to zero motion (e.g., MvPx=0 or 1 or −1), the MV prediction is zero. In the rest of the cases, the MV prediction is calculated from spatial information.

This scheme performs considerably better than the H.264/AVC scheme as it existed prior to July of 2002 and others like it, especially when the distance between frames (e.g., either due to frame rate and/or number of B frames used) is large, and/or when there is significant motion within the sequence that does not follow the constant motion rules. This makes sense considering that temporal statistical dependence of the motion parameters becomes considerably smaller when distance between frames increases.

Adaptive Selection of Direct Mode Type at the Frame Level:

Considering that both of the above improved exemplary methods/schemes have different advantages in different types of sequences (or motion types), but also have other benefits (i.e., the second scheme requiring reduced division processing, little additional memory, storage/complexity), in accordance with certain further aspects of the present invention, a combination of both schemes is employed. In the following example of a combined scheme certain decisions are made at a frame/slice level.

According to this exemplary combined scheme, a parameter or the like is transmitted at a frame/slice level that describes which of the two schemes is to be used. The selection may be made, for example, by the user, an RDO scheme (e.g., similar to what is currently being done for field/frame adaptive), and/or even by an "automatic pre-analysis and pre-decision" scheme (e.g., see FIGS. 10a-b).

Figure 10A:
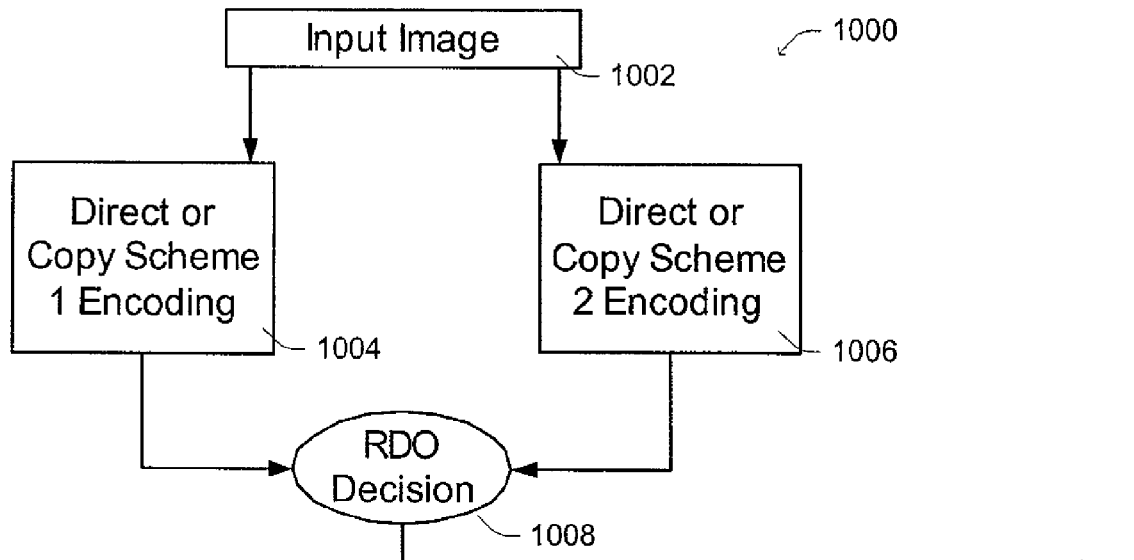
FIGS. 10a-b are illustrative diagrams showing how Direct/Skip Mode decision can be performed either by an adaptive picture level RDO decision and/or by user scheme selection, in accordance with certain exemplary implementations of the present invention.
Figure 10B:
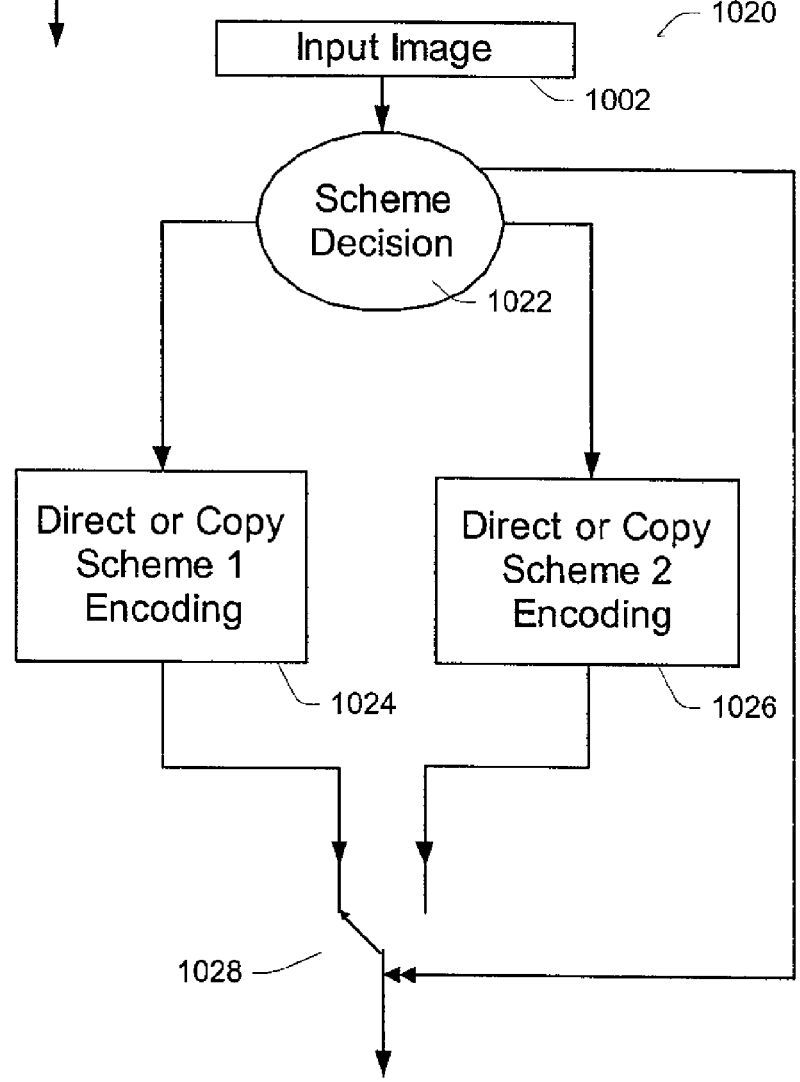

FIGS. 10a-b are illustrative diagrams showing how Direct/Skip Mode decision can be performed either by an adaptive frame level RDO decision and/or by user scheme selection, respectively, in accordance with certain exemplary implementations of the present invention.

In FIG. 10a method 1000 includes act 1002 wherein the input image is provided to a plurality of different Direct or Copy encoding schemes, herein illustrated by acts 1004 and 1006. Act 1004 employs direct scheme encoding, where the MV prediction is calculated from temporal information as the equation (2). Act 1006 employs copy scheme encoding, where the MV prediction is calculated from spatial information. Once the input image has been encoded per acts 1004 and 1006, then in act 1008, an RDO or other like decision is made to select a desired encoded image output.

In FIG. 10b method 1020 includes act 1002 wherein the input image is provided to act 1022 wherein a scheme decision is made to selectively determine which if any of a plurality of different Direct or Copy encoding schemes will be employed, herein illustrated by acts 1024 and 1026. The decision in act 1022 can be explicitly accomplished with user inputs, for example. In act 1022, more intelligent and/or automated methods may be used for more optimally selecting the best direct method for each picture. Act 1024 employs a direct scheme encoding, where the MV prediction is calculated from temporal information as the equation (2). Act 1026 employs a copy scheme encoding, where the MV prediction is calculated from spatial information. Once the input image has been encoded per selected acts 1024, 1026 and/or otherwise provided, then in act 1028, another selection decision is made to select a desired output.

In certain implementations, one of the schemes, such as, for example, scheme B (acts 1006 and 1026) is made as a mandatory scheme. This would enable even the simplest devices to have B frames, whereas scheme A (acts 1004 and 1024) could be an optional scheme which, for example, one may desire to employ for achieving higher performance.

Decoding logic/devices which do not support this improved scheme could easily drop these frames by recognizing them through the difference in syntax. A similar design could also work for P pictures where, for some applications (e.g., surveillance), one might not want to use the skip mode with Motion Vector Prediction, but instead use zero motion vectors. In such a case, the decoder complexity will be reduced.

An exemplary proposed syntax change within a slice header of the draft H.264/AVC standard is shown in the table listed in FIG. 11. Here, the new additional parameters are copy_mv_spatial and direct_mv_spatial for P pictures and B pictures respectively. Value 0 for these parameters implies Skip on MVP for P frames, and MVP Direct for B frames. If MVP Direct is used (direct_mv_spatial=0), it is not necessary to transmit the additional direct parameters.

Figure 12:
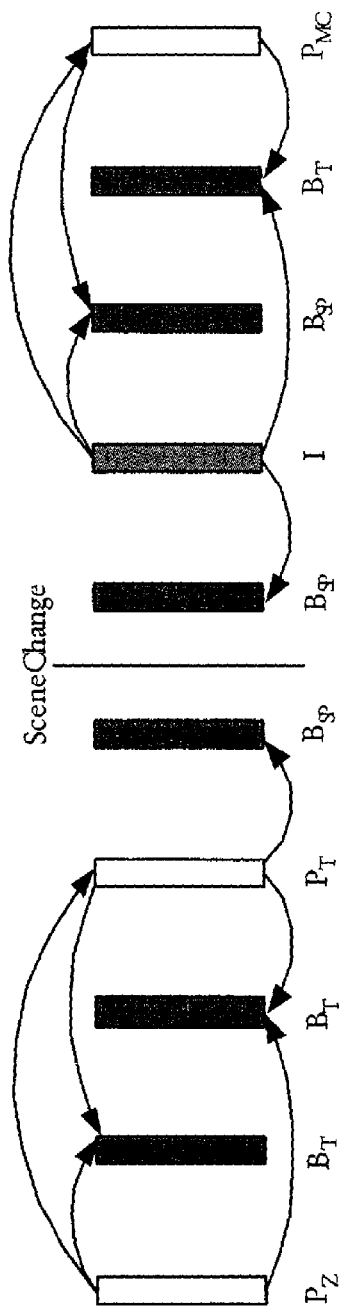
FIG. 12 is an illustrative diagram depicting different frames which signal the use of a different type of prediction for their corresponding Direct (B) and Skip (P) modes. $P_Z$, $P_T$, and $P_M$, define for example zero, temporal and spatial prediction, and $B_T$, $B_{SP}$, define temporal and spatial prediction for Direct Mode, in accordance with certain exemplary implementations of the present invention.

A potential scenario in which the above design might give considerably better performance than the draft H.264/AVC scheme prior to July of 2002 can be seen in FIG. 12, which is an illustrative diagram depicting different frames signal different type of prediction for their corresponding Direct (B) and Skip (P) modes. Here, $P_Z$, $P_T$, and $P_M$, define for example zero, temporal and spatial prediction, and $B_T$, $B_{SP}$, define temporal and spatial prediction for Direct Mode, in accordance with certain exemplary implementations of the present invention.

In certain implementations, instead of transmitting the direct_mv_scale_divisor parameter a second parameter direct_mv_scale_div_diff may be transmitted and which is equal to:

$$\text{direct\_mv\_scale\_div\_diff} = \text{direct\_mv\_scale\_divisor} - (\text{direct\_mv\_scale\_fwd} - \text{direct\_mv\_scale\_bwd}).$$

Exemplary Performance Analysis

Simulation results were performed according to the test conditions specified in G. Sullivan, "Recommended Simulation Common Conditions for H.26L Coding Efficiency Experiments on Low-Resolution Progressive-Scan Source Material", document VCEG-N81, Sep. 2001.

The performance was tested for both UVLC and CABAC entropy coding methods of H.264/AVC, with 1-5 reference frames, whereas for all CIF sequences we used $\frac{1}{8}^{th}$ subpixel motion compensation. 2B frames in-between P frames were used. Some additional test sequences were also selected. Since it is also believed that bidirectional prediction for block sizes smaller than 8×8 may be unnecessary and could be quite costly to a decoder, also included are results for the MVP only case with this feature disabled. RDO was enabled in the experiments. Some simulation results where the Direct Mode parameters are calculated according to the text are also included, but without considering the overhead of the additional parameters transmitted.

Currently the RDO of the system uses the following equation for calculating the Lagrangian parameter λ for I and P frames:

$$\lambda_{I,P} = 0.85 \times 2^{\frac{QP}{3}} \quad (3)$$

where QP is the quantizer used for the current Macroblock. The B frame λ though is equal to $\lambda_B = 4 \times \lambda_{I,P}$.

Considering that the usage of the MVP requires a more accurate motion field to work properly, it appears from this equation that the λ parameter used for B frames might be too large and therefore inappropriate for the improved schemes presented here.

From experiments it has been found that an adaptive weighting such as:

$$f(QP) = \max\left(2, \min\left(4, \frac{QP}{6}\right)\right)$$

tends to perform much better for the QP range of interest (e.g., QP∈{16, 20, 24, 28}). In this exemplary empirical formula QP/6 is truncated between 2 and 4 because $\lambda_B$ has no linear relationship with $\lambda_{I,P}$ when, QP is too large or too small. Furthermore, also added to this scheme was a conditional consideration of the Non-Residual Direct mode since, due to the (16×16) size of the Direct Mode, some coefficients might not be completely thrown away, whereas the non residual Direct mode could improve efficiency.

It was also found that the conditional consideration, which was basically an evaluation of the significance of the Residual Direct mode's Coded Block Pattern (CBP) using MOD(CBP, 16)<5, behaves much better in the RDO sense than a non conditional one. More particularly, considering that forcing a Non-RDO mode essentially implies an unknown higher quantization value, the performance of an in-loop de-blocking filter deteriorates. The error also added by this may be more significant than expected especially since there can be cases wherein no bits are required for the encoding of the NR-Direct mode, thus not properly using the λ parameter. In addition, it was also observed that using a larger quantizer such as QP+N (N>0) for B frames would give considerably better performance than the non conditional NR-Direct consideration, but not compared to the conditional one.

The experimental results show that the usage of the MVP, apart from having several additional benefits and solving almost all, if not all, related problems of Direct Mode, with proper RDO could achieve similar if not better performance than conventional systems.

The performance of such improved systems is dependent on the design of the motion vector and mode decision. It could be argued that the tested scheme, with the current RDO, in most of the cases tested is not as good as the partial MVP consideration with the same RDO enabled, but the benefits discussed above are too significant to be ignored. It is also pointed out that performance tends to improve further when the distance between the reference images increases. Experiments on additional sequences and conditions (including 3B frames) are also included in the table shown in FIG. 21.

As such, FIG. 21 is a table showing the performance difference of exemplary proposed schemes and proposed RDO versus conventional software (i.e., H.264/AVC JM3.3), in accordance with certain exemplary implementations of the present invention.

Here, the resulting performance of the improved scheme versus previously reported performance may be due at least in part to the larger λ of the JM version that was used, which basically benefited the zero reference more than others. Finally, not using block sizes smaller than 8×8 for bidirectional prediction does not appear to have any negative impact in the performance of the improved scheme/design.

Figures 13, 14:
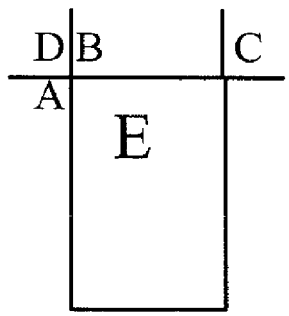
FIG. 13 is a table showing modifications to modes for 8×8 blocks in B pictures/slices applicable to the H.264/AVC coding scheme, in accordance with certain exemplary implementations of the present invention.
FIG. 14 is an illustrative diagram depicting median prediction of motion vectors, in accordance with certain exemplary implementations of the present invention.

FIG. 13 is a table showing modifications to modes for 8×8 blocks in B pictures/slices applicable to the draft H.264/AVC scheme, in accordance with certain exemplary implementations of the present invention. Experimental results show that the addition of this improvement reduces the efficiency of the improved scheme by only about 0.5% on the average (i.e., about 0.02 dB).

It is also noted that for different sequences of frames the two proposed schemes (e.g., A, B) demonstrate different behavior. It appears that the adaptive selection tends to improve performance further since it makes possible the selection of the better/best possible coding scheme for each frame/slice. Doing so also enables lower capability devices to decode MVP only B frames while rejecting the rest.

Motion Vector (MV) prediction will now be described in greater detail based on the exemplary improved schemes presented herein and the experimental results and/or expectations associated there with.

Motion Vector Prediction Description:

FIG. 14 is an illustrative diagram depicting median prediction of motion vectors, in accordance with certain exemplary implementations of the present invention.

The draft H.264/AVC scheme is obscure with regards to Motion Vector Prediction for many cases. According to the text, the vector component E of the indicated block in FIG. 14 is predicted normally as the median of A, B and C. However, the prediction may be modified as described below:

A The component applying to the sample to the left of the upper left sample in E B The component applying to the sample just above the upper left sample in E C The component applying to the sample above and to the right of the upper right sample in E D The component applying to the sample above and to the left of the upper left sample in E A, B, C, D and E may represent motion vectors from different reference pictures. The following substitutions may be made prior to median filtering:

Rule 1: If A and D are outside the picture, their values are assumed to be zero and they are considered to have "different reference picture than E".

Rule 2: If D, B, and C are outside the picture, the prediction is equal to A (equivalent to replacing B and C with A before median filtering).

Rule 3: If C is outside the picture or still not available due to the order of vector data (see FIG. 2), C is replaced by D.

If any of the blocks A, B, C, D are intra coded then they count as having a "different reference picture". If one and only one of the vector components used in the median calculation (A, B, C) refer to the same reference picture as the vector component E, this one vector component is used to predict E.

By examining, all possible combinations according to the above, the table in FIG. 15 can be generated. Here, for example, FIG. 15 shows a table for P-Picture Motion Vector prediction (e.g., Non-Skip, non-8×16, non-16×8 MBs), in accordance with certain exemplary implementations of the present invention.

Figure 16:
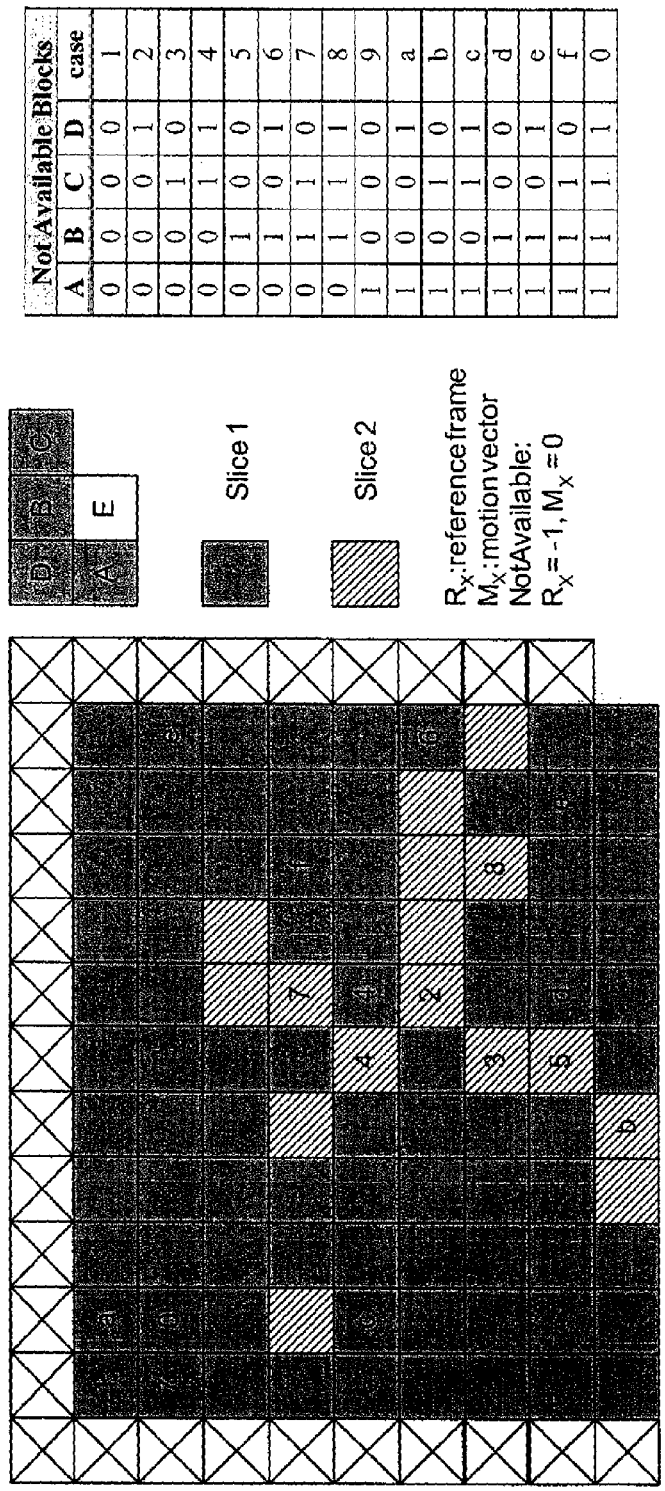
FIG. 16 is an illustrative diagram depicting median prediction of motion vectors, in accordance with certain exemplary implementations of the present invention.

In this context, "availability" is determined by whether a macroblock is "outside the picture" (which is defined to include being outside the slice as well as outside the picture) or "still not available due to the order of vector data". According also to the above text, if a block is available but intra, a macroblock A, B, C, or D is counted as having a "different reference picture" from E, but the text does not specify what motion vector value is used. Even though the software assumes this is zero, this is not clearly described in the text. All these cases and rules can also be illustrated by considering FIG. 16, which is an illustrative diagram depicting median prediction of motion vectors, in accordance with certain exemplary implementations of the present invention.

To solve the above issues and clarify completely motion vector prediction, it is proposed that the following exemplary "rule changes" be implemented in such a system according to which the main difference is in modifying Rule 1 (above) and merging it with Rule 4, for example, as listed below:

Rule 0: Median rule is applied for Motion vector calculation:

$M_E$=Median($M_A, M_B, M_C$)

Rule 1: If a predictor is outside of the picture/slice or is intra then this predictor is assumed to have zero motion vectors and "different reference picture than E".

Rule 2: If B & C & D outside of picture $\Rightarrow$ $M_E = M_A$, i.e., if D, B, and C are outside the picture, the prediction of E is equal to A Rule 3: If C not available (outside of picture, not yet coded etc) C is replaced by D Rule 4: If x (x$\in$A, B, C) and only x has $R_x = R_E$ then $M_E = M_x$ The interpretation of Rule 4 is, if only one (referred to x) of A, B, C has the same MV as E in the reference frame, and then the prediction of E is equal to x.

These exemplary modified rules are adaptable for H.264/AVC, MPEG or any other like standard or coding logic process, method, and/or apparatus.

Figure 17:
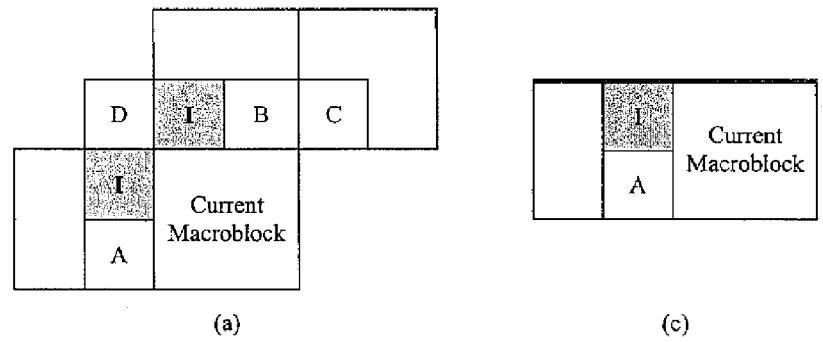
FIG. 17 is an illustrative diagram showing replacement of Intra subblock predictors with adjacent Inter subblock predictors, in accordance with certain exemplary implementations of the present invention.

FIG. 17, for example, is an illustrative diagram showing replacement of Intra subblock predictors with adjacent Inter subblock predictors, in accordance with certain exemplary implementations of the present invention and the above exemplary modified rules.

Some additional exemplary rules that may also be implemented and which provide some further benefit in encoding include:

Rule W: If $x_1$ ($x_1 \in$A, B, C) and $x_2$ ($x_2 \in$A, B, C, $x_2 \neq x_1$) are intra and $x_3$ ($x_3 \in$A, B, C, $x_3 \neq x_2 \neq x_1$) is not, then only $x_3$ is used in the prediction.

The interpretation of rule W is, if two of A, B, C are coded with Intra and the third is coded with Inter, and then it is used in the prediction.

Rule X: Replacement of intra subblock predictors (due to tree structure) by adjacent non intra subblock within same Macroblock for candidates A and B (applicable only to 16×16, 16×8, and 8×1 blocks), e.g., as in FIG. 17.

Figure 18:
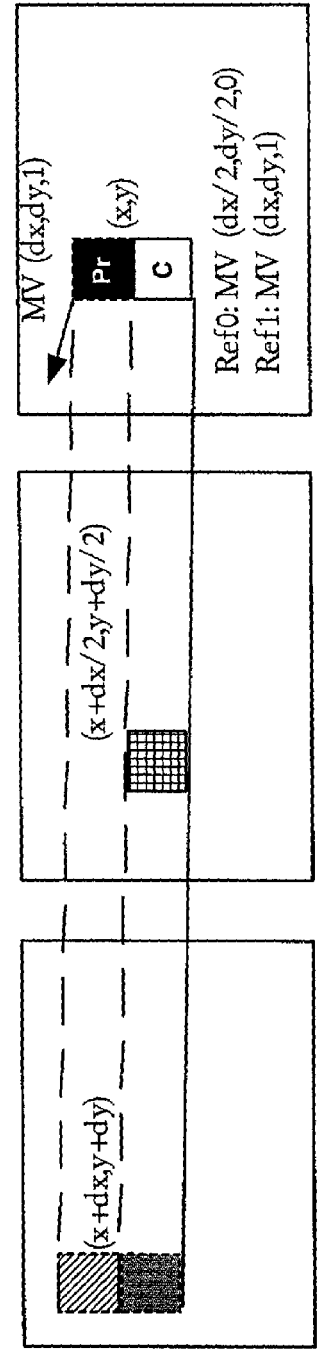
FIG. 18 is an illustrative diagram depicting how Motion Vector Prediction of current block (C) may consider the reference frame information of the predictor macroblocks (Pr) and perform the proper adjustments (e.g., scaling of the predictors), in accordance with certain exemplary implementations of the present invention.

Rule Y: If TR information is available, motion vectors are scaled according to their temporal distances versus the current reference. See, for example, FIG. 18, which is an illustrative diagram depicting how Motion Vector Prediction of current block (C) may consider the reference frame information of the predictor macroblocks (Pr) and perform the proper adjustments (e.g., scaling of the predictors), in accordance with certain exemplary implementations of the present invention.

With Rule Y, if predictors A, B, and C use reference frames RefA, RefB, and RefC, respectively, and the current reference frame is Ref, then the median predictor is calculated as follows:

$$\overrightarrow{MV}_{pred} = Ref \times \text{Median}\left(\frac{\overrightarrow{MV}_A}{RefA}, \frac{\overrightarrow{MV}_B}{RefB}, \frac{\overrightarrow{MV}_C}{RefC}\right) \quad (4)$$

It has been found that computation such as this can significantly improve coding efficiency (e.g., up to at least 10% for P pictures) especially for highly temporally consistent sequences such as sequence Bus or Mobile. Considering Direct Mode, TR, and division, unfortunately, even though performance-wise such a solution sounds attractive, it may not be suitable in some implementations.

Figure 19:
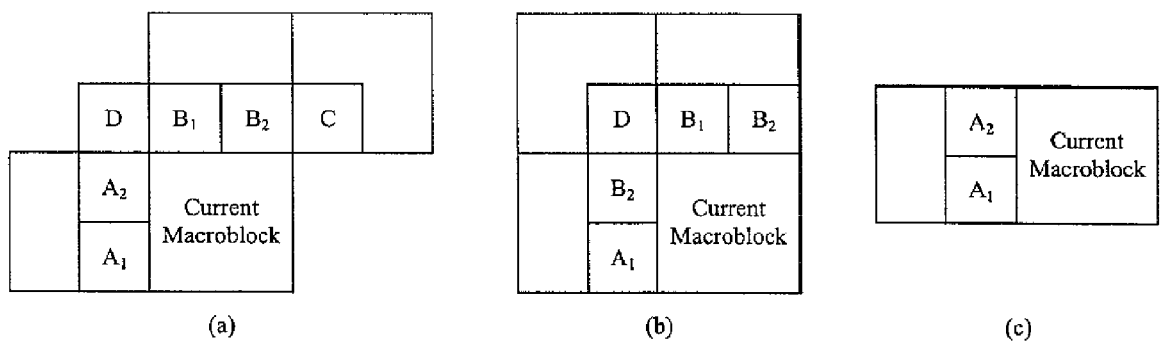
FIG. 19 is an illustrative diagram depicting certain exemplary predictors for 8×8 partitioning, in accordance with certain exemplary implementations of the present invention.

Rule Z: Switching of predictor positions within a Macroblock (e.g., for left predictor for the 16×16 Mode), use the A1 instead of A2 and B2 instead of B1 as shown, for example, in FIG. 19, which is an illustrative diagram depicting certain exemplary predictors for 8×8 partitioning, in accordance with certain exemplary implementations of the present invention.

Performance Analysis of Lagrangian Parameter Selection:

Rate Distortion Optimization (RDO) with the usage of Lagrangian Parameters ($\lambda$) represent one technique that can potentially increase coding efficiency of video coding systems. Such methods, for example, are based on the principle of jointly minimizing both Distortion D and Rate R using an equation of the form:

$$J = D + \lambda \cdot R \quad (5)$$

The JVT reference encoding method for the draft H.264/AVC standard as it existed prior to July of 2002, for example, has adopted RDO as the encoding method of choice, even though this is not considered as normative, whereas all testing conditions of new proposals and evaluations appear to be based on such methods.

The success of the encoding system appears highly dependent on the selection of $\lambda$ which is in the current software selected, for I and P frame, as:

$$\lambda_{I,P} = 0.85 \times 2^{\frac{QP}{3}}$$

where QP is the quantizer used for the current Macroblock, and $$\lambda_B = 4 \times \lambda_{I,P}$$

is used for B frames.

In accordance with certain aspects of the present invention, it was determined that these functions can be improved upon. In the sections below, exemplary analysis into the performance mainly with regard to B frames is provided. Also, proposed is an improved interim value for $\lambda$.

Rate Distortion Optimization:

By way of example, the H.264/AVC reference software as it existed prior to July of 2002 included two different complexity modes used for the encoding of a sequence, namely, a high complexity mode and a lower complexity mode. As described above, the high complexity mode is based on a RDO scheme with the usage of Lagrangian parameters which try to optimize separately several aspects of the encoding. This includes motion estimation, intra block decision, sub-block decision of the tree macroblock structure, and the final mode decision of a macroblock. This method depends highly on the values of $\lambda$ which though have been changed several times in the past. For example, the value of $\lambda$ has recently change from $$\lambda_{I,P} = 5 \times \frac{QP+5}{34-QP} \times \exp^{\frac{QP}{10}} \quad (6)$$

to $$\lambda_{I,P} = 0.85 \times 2^{\frac{QP}{3}} \quad (7)$$

or basically $$\lambda_{I,P} = \frac{A}{1000} \times 2^{\frac{QP}{3}} \quad (8)$$

where A=850, mainly since the previous function could not accommodate the new QP range adopted by the standard. Apparently though the decision of changing the value of $\lambda$ appears to most likely have been solely based on P frame performance, and probably was not carefully tested.

In experiments conducted in the present invention discovery process it was determined that, especially for the testing conditions recommended by the JVT prior to July of 2002, the two equations are considerably different. Such a relationship can be seen in FIG. 20, which is a table showing the relationship between previous $\lambda$ and current $\lambda$, in accordance with certain exemplary implementations of the present invention.

Here, one can note that for the range (16, 20, 24, 28) the new $\lambda$ is, surprisingly, between 18% and 36% larger than the previous value. The increase in $\lambda$ can have several negative effects in the overall performance of the encoder, such as in reduced reference frame quality and/or at the efficiency of motion estimation/prediction.

It is pointed out that the PSNR does not always imply a good visual quality, and that it was observed that in several cases several blocking artifacts may appear even at higher bit rates. This may also be affected by the usage of the Non-residual skip mode, which in a sense bypasses the specified quantizer value and thus reduces the efficiency of a deblocking filter. This may be more visually understood when taking in consideration that this mode could in several cases require even zero bits to be encoded, thus minimizing the effect of the $\lambda$ ($\lambda$ depends on the original QP). Considering that the distortion of all other, more efficient, macroblock modes is penalized by the larger value of $\lambda$ it becomes apparent that quite possibly the actual coding efficiency of the current codec has been reduced. Furthermore, as mentioned above, the new value was most likely not tested within B frames.

In view of the fact that B frames rely even more on the quality of their references and use an even larger Lagrangian parameter ($\lambda_B = 4 \times \lambda_{I,P}$), experimental analysis was conducted to evaluate the performance of the current $\lambda$ when B frames are enabled. Here, for example, a comparison was done regarding the performance with A=500 and A=700 (note that the later gives results very close to the previous, e-based $\lambda$).

In the experimental design, the $\lambda$ for B frames was calculated as:

$$\lambda_B = \max\left(2, \min\left(4, \frac{QP}{6}\right)\right) \times \lambda_{I,P}$$

since at times $\lambda_B = 4 \times \lambda_{I,P}$ was deemed to excessive. In this empirical formula QP/6 is truncated between 2 and 4 because $\lambda_B$ has no linear relationship with $\lambda_{I,P}$ when QP is too large or too small.

Based on these experiments, it was observed that if the same QP is used for both B and P frames, A=500 outperforms considerably the current $\lambda$ (A=850). More specifically, encoding performance can be up to about at least 2.75% bit savings (about 0.113 dB higher) for the exemplary test sequences examined. The results are listed in FIG. 22, which is a table showing a comparison of encoding performance for different values of $\lambda$, in accordance with certain exemplary implementations of the present invention.

Considering the above performance it appears that an improved value of A between about 500 and about 700 may prove useful. Even though from the above results the value of 500 appears to give better performance in most cases (except container) this could affect the performance of P frames as well, thus a larger value may be a better choice. In certain implementations, for example, A=680 worked significantly well.

CONCLUSION

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

What is claimed is:

1. In a computing device that implements a video encoder, a method for use in encoding video data, the method comprising:
within a sequence of video pictures, selecting a current video picture to be encoded as a B-picture;
dividing the current video picture into portions and, from among the portions, selecting a current direct mode portion to be encoded using spatial motion vector prediction; and
with the computing device that implements the video encoder, encoding the current direct mode portion, including:
determining a first reference picture for said current direct mode portion, wherein the first reference picture is selected from a first reference picture list, and wherein the selection of the first reference picture comprises determining a first minimum reference picture index among reference picture indices of plural surrounding portions of the current video picture for the first reference picture list;
assigning a first predicted motion vector to said current direct mode portion using spatial motion vector prediction, said first predicted motion vector referencing data associated with said first reference picture, wherein said first predicted motion vector is not based on a temporal interpolation interpolation of motion vectors used for encoding said first reference picture, wherein said first predicted motion vector is selected from first motion vector data for the plural surrounding portions of the current video picture, and wherein the selection of the first predicted motion vector comprises determining median values of the first motion vector data for the plural surrounding portions;
determining a second reference picture for said current direct mode portion, wherein the second reference picture is selected from a second reference picture list, and wherein the selection of the second reference picture comprises determining a second minimum reference picture index among reference picture indices of the plural surrounding portions for the second reference picture list;
assigning a second predicted motion vector to said current direct mode portion using spatial motion vector prediction, said second predicted motion vector referencing data associated with said second reference picture, wherein said second predicted motion vector is selected from second motion vector data for the plural surrounding portions of the current video picture, and wherein the selection of the second predicted motion vector comprises determining median values of the second motion vector data for the plural surrounding portions; and
performing motion compensation for said current direct mode portion.

2. The method as recited in claim 1, wherein said first reference picture either temporally precedes or temporally follows said current video picture in said sequence of video pictures.

3. The method as recited in claim 1, wherein said second reference picture either temporally precedes or temporally follows said current video picture in said sequence of video pictures.

4. The method as recited in claim 1, wherein said first and second reference pictures both either temporally precede or temporally follow said current video picture in said sequence of video pictures.

5. The method as recited in claim 1, wherein said first reference picture either temporally precedes or temporally follows said second reference picture in said sequence of video pictures.

6. The method as recited in claim 1, wherein said second reference picture either temporally precedes or temporally follows said first reference picture in said sequence of video pictures.

7. The method as recited in claim 1, wherein said sequence of video pictures includes interlaced pictures.

8. The method as recited in claim 1, further comprising:
outputting encoded data for the current video picture in a bitstream along with information that indicates a decision between spatial motion vector prediction and temporal motion vector prediction.

9. The method as recited in claim 1, wherein the current direct mode portion is a current direct mode macroblock, and wherein the plural surrounding portions are plural spatially neighboring macroblocks in a slice of the current video picture.

10. In a computing device that implements a video decoder, a method for use in decoding video data, the method comprising:
receiving encoded data in a bitstream along with information that indicates a decision between spatial motion vector prediction and temporal motion vector prediction; and
with the computing device that implements the video decoder, decoding a current video picture in a sequence of video pictures, the current video picture having been encoded as a B-picture, the current video picture comprising a current direct mode portion to be decoded using spatial motion vector prediction, wherein the decoding the current direct mode portion includes:
determining a first reference picture for the current direct mode portion, wherein the first reference picture is selected from a first reference picture list, and wherein the selection of the first reference picture comprises determining a first minimum reference picture index among reference picture indices of 1 neighboring portions of video picture for the first reference picture list;
determining a first predicted motion vector for the current direct mode portion using spatial motion vector prediction, the first predicted motion vector referencing data associated with the first reference picture, wherein the first predicted motion vector is selected from first motion vector data for the plural spatially neighboring portions of the current video picture, and wherein the selection of the first predicted motion vector comprises determining median values of the first motion vector data for the plural spatially neighboring portions;
determining a second reference picture for the current direct mode portion, wherein the second reference picture is selected from a second reference picture list, and wherein the selection of the second reference picture comprises determining a second minimum reference picture index among reference picture indices of the plural spatially neighboring portions for the second reference picture list;
determining a second predicted motion vector for the current direct mode portion using, spatial motion vector prediction, the second predicted motion vector referencing data associated with the second reference picture, wherein the second predicted motion vector is selected from second motion vector data for the plural spatially neighboring portions of the current video picture, and wherein the selection of the second predicted motion vector comprises determining median values of the second motion vector data for the plural spatially neighboring portions; and performing motion compensation for the current direct mode portion.

11. The method of claim 10, wherein the first reference picture either temporally precedes or temporally follows the current video picture in the sequence of video pictures.

12. The method of claim 10, wherein the second reference picture either temporally precedes or temporally follows the current video picture in the sequence of video pictures.

13. The method of claim 10, wherein the current direct mode portion is a current direct mode macroblock, and wherein the plural spatially neighboring portions are plural spatially neighboring macroblocks in a slice of the current video picture.

14. A computing device that implements a video decoder, the computing device comprising a processor, memory and computer-readable storage storing computer-executable instructions for causing the computing device to perform a method comprising:

receiving encoded data in a bitstream along with information that indicates a decision between spatial motion vector prediction and temporal motion vector prediction; and decoding a current video picture in a sequence of video pictures, wherein the current video picture has been encoded as a B-picture, the current video picture comprising a current direct mode macroblock to be decoded using spatial motion vector prediction, and wherein the decoding the current direct mode macroblock includes:

determining a first reference picture for the current direct mode macroblock as having a first minimum reference picture index among reference picture indices of plural spatially neighboring macroblocks of the current video picture for a first reference list;

determining a first predicted motion vector for the current direct mode macroblock using spatial motion vector prediction, the first predicted motion vector referencing data associated with the first reference picture, wherein the first predicted motion vector is based on median values of first motion vector data for the plural spatially neighboring macroblocks;

determining a second reference picture for the current direct mode macroblock as having a second minimum reference picture index among reference picture indices of the plural spatially neighboring macroblocks for a second reference picture list;

determining a second predicted motion vector for the current direct mode macroblock using spatial motion vector prediction, the second predicted motion vector referencing data associated with the second reference picture, wherein the second predicted motion vector is based on median values of second motion vector data for the plural spatially neighboring macroblocks; and performing motion compensation for the current direct mode macroblock.

15. The computing device of claim 14, wherein the first reference picture either temporally precedes or temporally follows the current video picture in the sequence of video pictures, and wherein the second reference picture either temporally precedes or temporally follows the current video picture in the sequence of video pictures.

16. One or more memory devices having stored thereon computer-executable instructions for causing a computing device programmed thereby to perform a method of decoding video data, the method comprising:

receiving encoded data in a bitstream along with information that indicates a decision between spatial motion vector prediction and temporal motion vector prediction; and decoding a current video picture in a sequence of video pictures, the current video picture having been encoded as a B-picture, the current video picture comprising a current direct mode portion to be decoded using spatial motion vector prediction, wherein the decoding the current direct mode portion includes:

determining a first reference picture for the current direct mode portion, wherein the first reference picture is selected from a first reference picture list, and wherein the selection of the first reference picture comprises determining a first minimum reference picture index among reference picture indices of plural spatially neighboring portions of the current video picture for the first reference picture list;

determining a first predicted motion vector for the current direct mode portion using spatial motion vector prediction, the first predicted motion vector referencing data associated with the first reference picture, wherein the first predicted motion vector is selected from first motion vector data for the plural spatially neighboring portions of the current video picture, and wherein the selection of the first predicted motion vector comprises determining median values of the first motion vector data for the plural spatially neighboring portions;

determining a second reference picture for the current direct mode portion, wherein the second reference picture is selected from a second reference picture list, and wherein the selection of the second reference picture comprises determining a second minimum reference picture index among reference picture indices of the plural spatially neighboring portions for the second reference picture list;

determining a second predicted motion vector for the current direct mode portion using spatial motion vector prediction, the second predicted motion vector referencing data associated with the second reference picture, wherein the second predicted motion vector is selected from second motion vector data for the plural spatially neighboring portions of the current video picture, and wherein the selection of the second predicted motion vector comprises determining median values of the second motion vector data for the plural spatially neighboring portions; and performing motion compensation for the current direct mode portion.

17. The one or more memory devices of claim 16, wherein the first reference picture either temporally precedes or temporally follows the current video picture in the sequence of video pictures.

18. The one or more memory devices of claim 16, wherein the second reference picture either temporally precedes or temporally follows the current video picture in the sequence of video pictures.

19. The one or more memory devices of claim 16, wherein the current direct mode portion is a current direct mode macroblock, and wherein the plural spatially neighboring portions are plural spatially neighboring macroblocks in a slice of the current video picture.

* * * * *